United States Patent [19]

Richburg

[11] Patent Number: 5,159,687
[45] Date of Patent: Oct. 27, 1992

[54] METHOD AND APPARATUS FOR GENERATING PROGRAM CODE FILES

[75] Inventor: Joseph B. Richburg, Dunwoody, Ga.

[73] Assignee: Caseworks, Inc., Dunwoody, Ga.

[21] Appl. No.: 457,853

[22] Filed: Dec. 27, 1989

Related U.S. Application Data

[63] Continuation of Ser. No. 436,568, Nov. 14, 1989, abandoned.

[51] Int. Cl.⁵ .................. G06F 15/24; G06F 15/42
[52] U.S. Cl. .................................... 395/700; 395/922
[58] Field of Search .............. 364/513, 188, 192, 468, 364/200, 147, 900; 395/700, 922

[56] References Cited

U.S. PATENT DOCUMENTS

| | | | |
|---|---|---|---|
| 4,484,303 | 11/1984 | Provanzano et al. | 364/147 |
| 4,658,370 | 4/1987 | Erman et al. | 364/900 |
| 4,754,409 | 6/1988 | Ashford et al. | 364/513 |
| 4,815,029 | 3/1989 | Barker et al. | 364/900 |
| 4,839,822 | 6/1989 | Dormond et al. | 364/513 |
| 4,841,441 | 6/1989 | Nixon et al. | 364/513 |
| 4,849,879 | 7/1989 | Chinnaswamy et al. | 364/513 |
| 4,853,873 | 8/1989 | Tsuji et al. | 364/513 |
| 4,864,492 | 9/1989 | Blakely-Fogel et al. | 364/513 |
| 4,916,633 | 4/1990 | Tychonievich et al. | 364/513 |
| 4,916,634 | 4/1990 | Collins et al. | 364/513 |
| 4,931,950 | 6/1990 | Isle et al. | 364/188 |
| 4,935,876 | 6/1990 | Hanatsuka | 364/513 |
| 4,939,668 | 7/1990 | Brown et al. | 364/468 |
| 4,967,381 | 10/1990 | Lane et al. | 364/192 |
| 4,970,658 | 11/1990 | Durbin | 364/513 |

OTHER PUBLICATIONS

"KBMS-An Expert System Building Tool", Ishigaki et al, 1989.
"Overview of Hitachi's Knowledge Information Processing System", Ishihara et al, Hitachi Review.
"A Programming Tool for Knowledge-Based Real Time Control Systems", Tano et al, IEEE 1988.

*Primary Examiner*—Allen R. MacDonald
*Assistant Examiner*—George Davis
*Attorney, Agent, or Firm*—Leydig, Voit & Mayer

[57] ABSTRACT

A method and system for automatic generation of program code using expert knowledge programmed into a knowledgebase. The expert knowledge includes not only program script units adapted to a generic problem to be solved, but also instructions for "composing" the script units into output script. An application database operates in conjunction with the knowledgebase. The function of the application database is to specify particular requirements for the process to be programmed within the generic set stored in the knowledgebase. A program processor responds to the application database and the knowledge database to produce output files coordinated to the particular task specified.

36 Claims, 11 Drawing Sheets

METHOD AND APPARATUS FOR GENERATING PROGRAM CODE FILES

This is a continuation of copending U.S. application Ser. No. 436,568, filed Nov. 14, 1989 now abandoned.

FIELD OF THE INVENTION

This invention relates to program code generation, and more particularly to a method and system for regularizing, standardizing and systematizing the program code generation function.

BACKGROUND OF THE INVENTION

Computer programming is a process in which a step-by-step procedure or algorithm is described using an available computer language. The described procedure is then "manufactured" into a computer program which is then used to control a computer to produce a desired result. Typically, the procedures and algorithms which are implemented are complex, and require that programmers be extensively trained and skilled in two arts—the application area in which they are working and the programming discipline. The latter discipline preferably requires extensive training and skill in various programming methods and languages, as well as in manufacturing (production) methods used to make computer programs.

The earliest programmable computers were programmed "by hand" directly in the machine's internal language. The programming process for such machines required that a programmer have a detailed understanding of the internal workings of the particular class of computers, as well as of the process being programmed. Those requirements coupled with the limitations of early machine language programmable devices limited the scope of applicability of such devices.

To a large extent, machine language programming and devices were replaced by second generation assembler languages. Although assembler languages, like machine languages, were machine specific, they made it easier for programmers to relate to the operation of the computer.

Procedural computer languages evolved to deal with the machine-specific limitation of the foregoing languages. Procedural languages are discipline oriented, such as COBOL for business, and FORTRAN for engineering and science. Procedural languages, once learned, can be applied by a larger class of potential programmers, but the resulting program scripts which they produce must still be manufactured (compiled) into a machine language form that the particular computer can understand.

Numerous such procedural compiler type languages have been developed, and most computer programming now performed uses such languages. While procedural compiler type languages have simplified the programming process, programming is still considered to be too difficult for a larger class of potential users.

Some of the effort toward further simplifying the task or computer programming continues the focus on programming languages. A number of fourth generation languages feature a rich set of problem-solving capabilities, but accomplish this through a reduced language syntax and more abbreviated grammars for the expression of computer solutions. Thus, such fourth generation languages permit relatively inexperienced programmers to produce results, and somewhat more skilled persons to produce results much more quickly, but are still somewhat limited. In a manner analogous to the limitation of spoken language which would be caused by reducing syntax and richness of expression, the syntax and grammar abbreviations in fourth generation languages limit the richness of the medium and thus reduce much of the flexibility available to programmers for expressing themselves clearly and completely. As a result, there are many types of problems which cannot be expressed or solved with fourth generation languages.

Software strategies have also evolved toward simplifying the programming task. There are current proponents of a top-down design strategy and other proponents who prefer a bottom-up object oriented design strategy. Top-down designs encourage the decomposition of the process into smaller and smaller parts, arriving ultimately at structural programming units that are realized with conventional programming languages. Top-down designs have the benefit of structuring the program solution, but tend to result in unique program parts that can only rarely be reused in making new software programs.

The bottom-up object oriented design strategy focuses on designing common, more reusable program components called objects. These program objects can be modeled after real world objects and can be standardized in many ways. The object oriented approach also encompasses an "inheritance" quality whereby an object can be derived from another more basic object and "inherit" many, if not all, of its properties. This bottom-up design approach has the major qualities of producing software components that are modular, extensible and reusable, but is not as conducive to structured design methods of the top-down design. Nor does the bottom-up object oriented design apply very well to development of medium-to-large software units.

As a further attempt at simplifying and standardizing the programming task, macro programming capabilities have evolved. For example, most program languages make use of functional subprogramming units which might be called procedures, functions or class objects. These sub-units encode (or script) the detailed steps of well-defined and often-used sub-units of programming, so that they are available for constant re-use as needed.

The use of software building blocks has merit in standardizing the generation of computer code to a certain extent, but the technique is rarely applied in building more complex, high level programming scripts because of the almost infinite variety and variation of larger structural units. When attempts have been made to produce large, general purpose programs or program units, they have not been entirely successful because the programs thus produced are often too large, too slow and too difficult to adequately maintain.

Thus, the current attempts at simplifying the programming task have reached a number of limits. The fourth generation languages reduce flexibility in solving a wide variety of problems. The use of structural building blocks has been limited to relatively smaller sub-units, and programmers constructing larger units have typically relied on their own intuition, skill, and expertise in assembling large programs, each being customized in part to the talents and "writing style" of the programmer in question. Those programs which have a large degree of flexibility built in (such as UNIX), are found reasonably difficult to use and when fully configured not sufficiently fast or efficient.

As a result, in order to produce an application specific program adapted to run a particular defined task with adequate speed and efficiency, it has been the practice to employ programmers to apply their skill and expertise in writing program code, some customized to the task, others selected before customization from units they had previously known or which are considered by them or others to be standards, but the end result is a customized program having very little standardization. This application of individual authorship in generation of computer programs is one of the factors which limits the ability of non-experts to assemble programs. Thus, whereas computers themselves are becoming more and more widespread, computer users are not actually programming, but are simply utilizing applications programmed by others. To the extent such users desire to actually program a specific task for their own use, they are inhibited by the perceived complexity of the task and the need for the skill outlined above in generating task-specific computer programs.

SUMMARY OF THE INVENTION

In view of the foregoing, it is a general aim of the present invention to create and widely disseminate expert programming knowledgebases, and to organize and control the knowledgebases so that they can be effectively utilized to generate computer program code files to satisfy individual requirements.

In that regard, it is an object of the present invention to create an expert programming knowledgebase suited to a given generic application, and to utilize that knowledgebase according to the requirements of a specific application within the genus to generate an output program code file from standard code units within the original knowledgebase.

Thus, an object is to capture once the knowledge of an expert programmer in addressing a generic application by producing program script and program coding rules for programming the generic application, then to apply application specific requirements to adapt the generic code to a specific use.

In accordance with one aspect of the invention, an object is to provide a new method of generating application specific program code which encompasses the capture of expert computer programming knowledge in such a way that it is selectively extracted from knowledgebase storage units and modified to meet individual program requirements.

According to one aspect of the invention, it is a subsidiary object to provide a means for specifying requirements to adapt the generic software units, and means in the knowledgebase for automatically linking the specified requirements to the standardized code for producing customized code units from the standardized units.

Stated broadly, an object of the present invention is to provide a method and means to create, manage, disseminate and utilize complex, standardized software scripts in a manner easily used and applied by a wide class of users. Such object is accomplished, in part, by storing standardized software units (e.g., program scripts), and a set of rules (e.g., an SEL language) which defines rules and procedures for assembling the standard software units. The use of such method encourages and supports consistency, reliability, extensibility and maintainability of the produced software units.

A feature of the invention is the provision of a method and means for organization and control of the computer programming process such that knowledge about complete programs, program components, and software production scripts can be stored, retrieved, manipulated and combined with end user requirements to produce unique output software units.

One objective of the method according to the present invention is to render the script generation process independent of any programming language, procedure (production) language, tag language, script language or any other text scripted process typically used for computer programming. More particularly, it is a feature of the invention that the knowledgebase components, including the stored standard software units, can be created and maintained with any common text editing program or similar computer utility. Thus, according to this feature of the invention, the method can be applied to any process which is realized by text scripting.

It is a further feature of the invention that the requirements of the specific application are maintained in a requirements database which is divided into a data part and a dictionary part. The data part defines the requirements for the particular application. The data dictionary serves as a universal link to the standard software units by way of the SEL language which controls the generation of the particular output program in accordance with the database of stored software units, the stored rules and procedures for assembling such units, and the requirements which dictate the manner of assembly. Thus, the invention divorces the methodology used to collect the database elements from the processing elements used to generate the actual output program code.

According to a specific feature of one implementation of the invention, a prototyper software program provides a user interface to the requirements database and allows the user by simple check-the-box or other step-by-step procedural processes to specify the requirements of the requirements database and have them stored in locations which will later be accessible to the program processor which constructs the final output code.

Other objects and advantages will become apparent from the following detailed description when taken in conjunction with the drawings, in which:

While the invention will be described in connection with certain preferred embodiments, there is no intent to limit it to those embodiments. On the contrary, the intent is to cover all alternatives, modifications and equivalents included within the spirit and scope of the invention as defined by the appended claims.

DETAILED DESCRIPTION OF THE PREFERRED EMBODIMENTS

Figure 1:
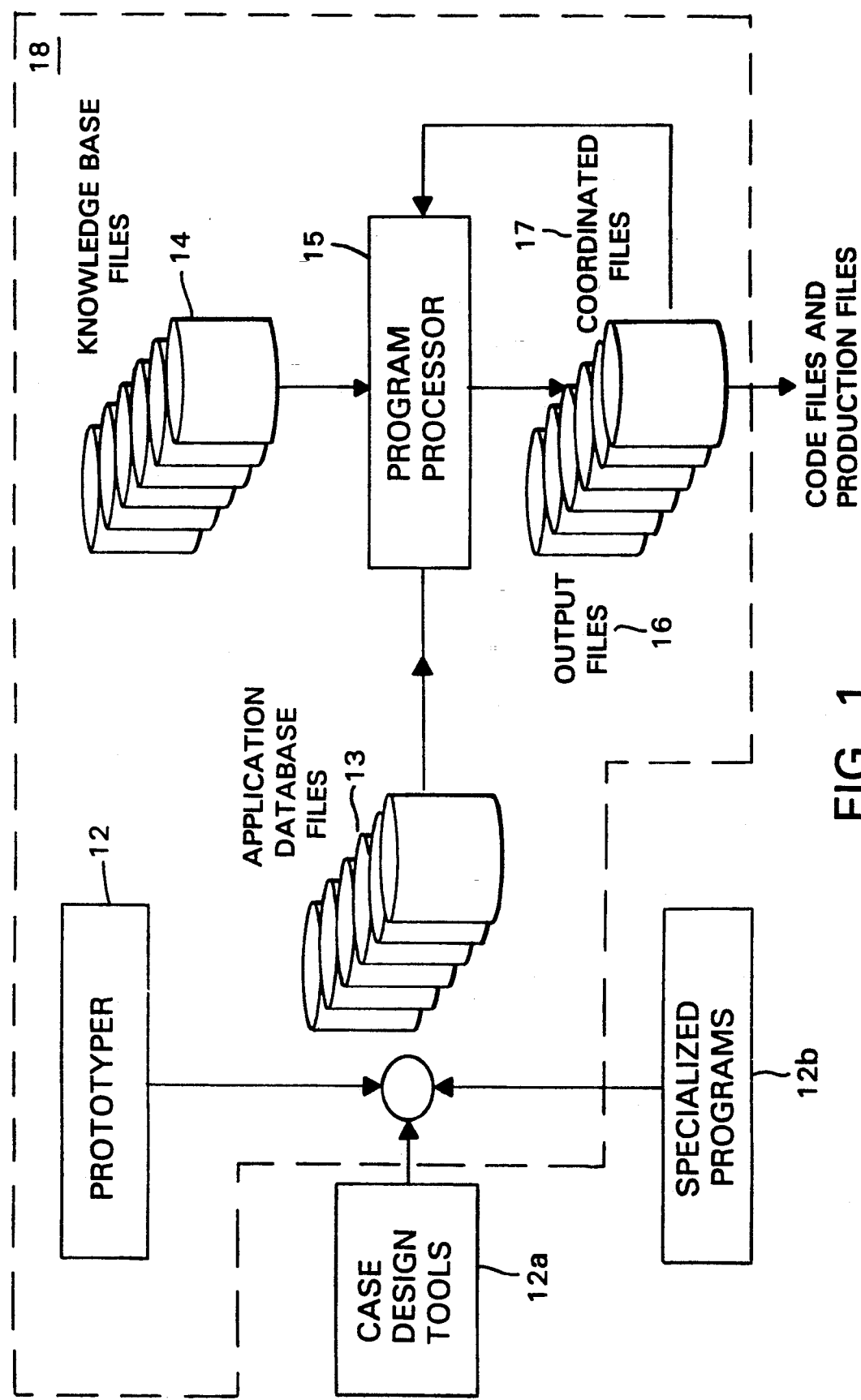
FIG. 1 is a block diagram illustrating the organization of a system exemplifying the present invention.

Turning now to the drawings, FIG. 1 shows the elements and organization of a system for generating program code in accordance with the present invention. The system comprises two primary input elements, in the form of application database files 13 and knowledgebase files 14, a processing element in the form of a program processor 15 and an output element in the form of output files 16. As will be described in greater detail below, the knowledgebase files 14 include static files in the form of program script and code generation files preferably in the form of SEL instructions which relate to rules and conventions for translating units of script file from the knowledgebase into "composed" units in the output files. The term "composed" is used in its broadest sense to refer to program code files which have been customized to a particular application. They can be taken from the standard script files in the knowledgebase and modified in one way or another as by assembly, modification, substitution, and the like. The term "composed" script units is intended to refer to all such processed files taken from the knowledgebase and output into a file adapted to a particular purpose.

As noted above, the knowledgebase files 14 in addition to the actual script include instructions for composing script units into an output script. The instructions are preferably in the form of a language herein termed SEL. A description of the SEL instructions is given within. Suffice it to say for the moment that the SEL instructions cause program script to be copied from the script files in the knowledgebase 14 to the output files 16 either conditionally or unconditionally dependent upon the functions of the program processor 15 as commanded by the SEL instructions in the knowledgebase 14.

In summary, the knowledgebase 14 represents a static file which includes both program script and instructions for composing the script. The static file within the knowledgebase is multi-faceted in that it is composed to be able to solve a generic problem, and has multiple variables which can be fixed or selected in order to specify a particular problem within the generic set. Thus, in configuring a knowledgebase, a programmer writes program code which is in the most general form for solution of a problem in all of its aspects, and codes into the SEL instructions associated with the script various variables, decisions, logic operations and the like needed to customize the generic program to any conceivable specific application.

In accordance with the invention, the requirements of the specific application are provided by the application database files 13 which are also coupled to the program processor 15. The program processor 15 under the control of SEL instructions from the knowledgebase files 14 accesses the application database files 13 as necessary. The application database files are assembled by a user in order to specify a particular problem within the generic set to be solved. The user can specify such requirements by way of a prototyper 12, CASE design tools 12a or specialized programs 12b. In any event, an application database file 13 is generated as a result of use of the tools 12, 12a, and 12b. Preferably, the application files 13 are arranged in the form of a dictionary having an alphanumeric or symbolic reference, associated with particular data entries keyed to the dictionary references. The knowledgebase files 14 also utilize the same alphanumeric references. Thus, the application database files 13 and the knowledgebase files 14 can be created independently but linked via the data dictionary and the alphanumeric references. Thus, by use of the prototyper 12, for example, a user can, by simple fill-in-the-blanks operation, create an application database file which specifies the attributes of a particular requirement within the generic set to which the knowledgebase 14 is directed.

After the creation of a particular application database, the program processor 15 can then respond to SEL instructions within the knowledgebase file to create an output file 16 customized by information in the application database. The output file includes both lines of script taken directly from the script files in the knowledgebase 14 and also other lines of code (sometimes with variables inserted from the application database files 13) and sometimes lines of code taken dependent on conditions determined from the application database file 13, and translated as "composed" to the output files 14.

The program processor 15 is configured as a state machine which can keep track of certain conditions, can iterate processes and the like to maintain a running or actual state which can be tested for use in decision-making in the generation of output files. Thus, if a particular SEL instruction in the knowledgebase 14 demands a particular state, the state variable maintained by the program processor 15 can be tested to determine the condition under which particular lines of stored file are composed either directly or in altered form to the output file 16.

The program processor 15 also has the capability of coordinating files from previously produced sets of code. Thus, in a prior iteration which generated an output program, a user might have manually added additional lines to the automatically generated program. Rather than require that after a new version of the program is generated the user again go back to reinsert all of the specialized code, use of the coordination file 17 allows a newly generated file to be coordinated with a previously generated version of that file so that any lines of specialized code added by the user will reappear in the output file 16 along with the program generated code produced by the program processor 15 from the knowledgebase 14 under the control of requirements specified in the application database 13.

It was also noted above that a prototyper 12 allows a fill-in-the-blanks type operation to specify the requirements for a particular application database. For example, the prototyper 12 can be a simple computer program which operates on a personal computer and shows, by means of menus or windows, various options which can be used for selecting variables to define a particular application program. The variables are selected by simple point and click operations on the part of the user to in turn specify the particular requirements for a specific program. The simplicity of programming by simple point and click to generate quite sophisticated output programs will now be apparent.

Figure 2:
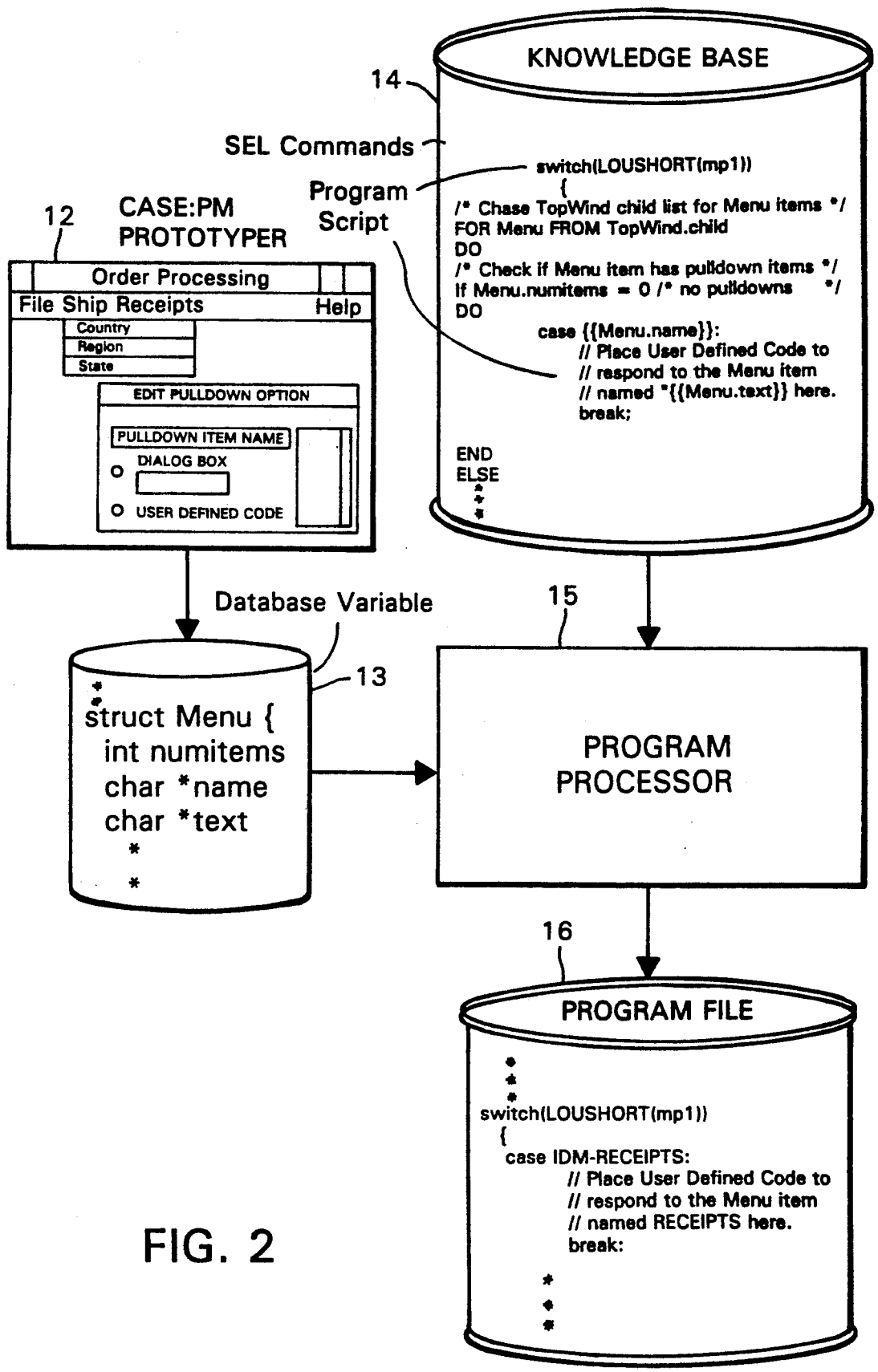
FIG. 2 is a diagram illustrating certain elements of the system of FIG. 1 in performance of a particular program generation function, exemplifying the broader use of the invention.

In addition to the prototyper 12 (which will be referred to in greater detail in connection with FIG. 2), the application database files 13 can also be created by means of generally available CASE design tools 12a, which are well known to those skilled in this art, or by means of other specialized programs 12b adapted to interrogate a user in order to specify particular requirements for a specific program within the genus stored in the knowledgebase.

Turning then to FIG. 2, the major elements of the system of FIG. 1 are shown, along with certain code lines written into the various elements to illustrate the translation of knowledge within the knowledgebase into an output file under the control of an application database file as specified by a prototyper.

It is seen that the prototyper 12 in the illustrated embodiment is simply a window type program which allows the user to point and click in order to specify certain requirements for the program then being created. In response to the point and click operation on the screen shown in the prototyper 12, the application database 13 creates a file as illustrated showing as an example a database variable identified as "int numitems".

The knowledgebase 14 is seen to include a plurality of SEL commands (those statements preceded by a period). It is seen that the SEL commands also include a conditional statement referring to the "numitems" which is the symbolic indicator identified in the database. The knowledgebase 14 is also shown to include lines of actual program script, as indicated.

The program processor 15 is shown to be responsive to the application database 13 and the knowledgebase 14 to create an output file 16. It is seen that the first line of code beginning with "switch" is translated directly from the knowledgebase 14 to the output file 16 in an unconditional fashion. It is furthermore seen that the conditional IF statement accesses the application database to create a variable named "RECEIPTS" within the output file 16. The manner in which the code script in the knowledgebase 14 is translated to the output file 16 in dependence on SEL statements in the knowledgebase 14 and requirements in the application database 13 will now be apparent.

In summary, the present invention provides a method and means for the automatic generation of text script files which are used to realize complete or partial computer applications from a specified user requirement. The method may be easily implemented on a relatively simple digital computer such as the IBM Personal Computer or similar device. The invention performs its functions by interfacing to an application requirements database containing a user specification for a software component, by accessing stored knowledge describing the detailed steps of the computer processes required to realize the software component, and by combining the two sources of information to automatically construct the program component. The invention may be implemented in a large and powerful computer system as well, or in a special purpose hardware processor, but it is not limited to any system.

Preferably the knowledgebase component 14 is presented to the computer 15 as one or more text files containing the expert knowledge about the specific computer process. The act of creating and structuring the stored knowledge and the steps that dictate how the knowledge is manipulated to construct software components is a straightforward and familiar process to software engineers. To this end, the invention interleaves the software engineering language (SEL) statements used to control the production of the program scripts within the same knowledgebase with the procedural program scripting used to realize the required software component. In this way, any text editor or text generating utility program can be used to compose a knowledgebase.

The application requirements database 13 should preferably be sufficiently flexible in format and content to communicate the broadest possible range of application requirements. Typically, the type of computer procedure that would be most ideal to collect application requirements information would be a computer process which would be consistent with the goal of easing the user interface such that a large class of potential programmers (technical and non-technical) could make use of it. Thus, any type of packaged computer program (a CASE design tool, for example) or any other programmed procedure that collects and stores program requirements information should be acceptable. However, the most straightforward gathering technique would employ a program designed to specifically prototype the requirements criteria; i.e., a prototyper program.

An important aspect regarding the creation of the requirements database 13 is that it be complete with regard to specifying the requirements information and the associated scheme that describes the information. This requirement dictates a format for the application database; i.e., a data part and a data dictionary part which are separate but related in the application database. Special programs, such as prototyper programs, developed specifically to collect application requirements should output their database records and associated data dictionaries in this format. Other requirements gathering programs, such as CASE programs, will be modified to add this kind of database output, or a translator program will be used to convert their ordinary output to the desired database format.

The primary purpose of the data dictionary portion of the requirements database 13 is to define the data scheme so that the program processor 15 can have access to the requirements data variables, tables, and data structures. The SEL language statements in the knowledgebase files 14) are programmed to reference the data elements defined in the application databases using the identifiers or labels defined in the stored data dictionary.

Referring again to FIG. 1, the prototyper program 12 presents to the user information screens and panels which are used to prompt for and collect the user program requirements. The collected program requirements information and its associated data dictionary are written to the application database 13. The program processor processes the SEL program and the scripts stored in the knowledgebases 14, processes the user program requirements stored in the application database 13, and produces the output files 16. Multiple application database files and knowledgebase files may constitute a single application and can be used to produce multiple output files.

The application database files can be produced using many different approaches including application design facilities of other systems, such as CASE systems that are used to model, and design application programs. The most preferred requirements gathering platform is a prototyper program 12. The application database 13 thus implemented becomes the requirements input presented to the program processor 15.

To provide wide latitude in the types of information that can be collected into a requirements database 13, the invention includes a unique method for the storage of many different kinds of computer data and data structures, and a method for storing a data dictionary that maps or outlines the requirements database 13. To provide for the most general specification of a user requirement, the database can contain a varied collection of data values, character strings, tables, and linked collections of such data units, typically called structures in many programming languages. To define the stored database values, the database 13 contains an integral data dictionary, which defines and locates each database element. In this way, any process creating a requirements database has great latitude in the kinds of information that is collected, and an ability to communicate the requirements data to the script generation process.

The program processor system 18 is the primary processing system component. The system 18 permits the one-time creation and storage of expert computer programming script processes in knowledgebase files 14, provides the specification within the knowledgebase of the software engineering steps required to create a computer program or program component from the stored scripts, provides for the stipulation of the specific program requirements in an application database 13, and provides the program processor 15 used to synthesize the input elements to produce the output components 16 the user would need to manufacture or make the application.

The knowledgebase files 14 are similar in purpose to recipes used in cooking. Recipes describe the detailed steps in a cooking process and identify specific ingredients, amounts, and variations in meal preparation procedures for making a particular dish. Likewise, knowledgebases specify a basic framework or protocol for a computer process and the different methods, techniques or approaches that, under varying circumstances, would be used to realize the computer programming process. Stored knowledgebases permit a programming expert, with proficiency in a particular computer process, to specify in detail the scripts that define the individual programming steps, the rules that govern the generation of particular statements and scripts, and the substitution rules which particularize the generic statements or scripts for the stated specific purpose.

The knowledgebase is then seen to be a repository of specific computer programming knowledge. Since it is a modular, autonomous entity that can be separately created and maintained, it is easily extended to provide new knowledge, or modified to add improved knowledge about a process. Its most important characteristic is that it can be reused extensively by a broad and diverse class of users. Like recipes, knowledgebases can be widely disseminated to share programming knowledge and methods and to make the programming process much more proficient, productive and error free.

The general purpose of the knowledgebase files 14 is to provide a receptacle for text script patterns and the associated software engineering language (SEL) instructions that dictate how the script elements will be formed into derivative script units. The software engineering language (SEL) is a programming language adapted to the purpose of controlling the script generation process. Output scripts can be used for many purposes, the most ostensible being program code scripts, programmed in many different computer languages used to realize a program or procedure, and the production scripts (procedure files) that are used to manufacture the computer units.

Attention will now be focused on a description of the sequence of operations by which the elements of FIG. 1 perform their assigned functions and interact with each other in accomplishing the objects of the invention. The usefulness of the apparatus begins in the recognition that there are software processes that are used repeatedly, and are typically rewritten partially or completely each time they are used to accomplish a new computer application or task. Such software processes could be standardized if there was a way to customize them to particular, unique user requirements.

All computer processes are realized in some form of computer language script that describes the steps a computer programmer envisions that are needed to accomplish the task. For certain of these processes to become standardized software components, inevitably the scripted processes must be adapted to meet differing requirements. Individual statements must be modified with new words, phrases, or other syntactical units to make them conform to a particular need. And, many times, one or more statements must be replaced with alternate scripts to adapt the process for some other problem convention or need. Regardless of the types of changes, deletions, additions, substitutions, etc., much of the standard process remains untouched, but usually has to be written by the computer programmer each time the process is reused. The result is lost productivity, inefficient use of the computer programmer's time, and increased cost to accomplish the software development tasks.

Preparing a knowledgebased solution for such standard programming situations begins by writing the basic script for the computer process, including all of its scripted variations, with consideration for the conventions, factors, variables, values, etc., that govern its adaptation to conventional needs. The governing factors may be requirements that are assembled during a CASE design session, and are thus available before the knowledgebase is developed. In other situations, the governing factors can be noted during the task of creating the knowledgebase, and become the basis for creating a prototyper program used to gather the application requirements.

The art of constructing a knowledgebase involves knowing how to create the process scripts that define the major function of the knowledgebase, and knowing how to intersperse throughout the process scripts the software engineering language (SEL) instructions that instruct the program processor how to generate the process scripts into output units that are unique to a user's requirements. Once this expert knowledge is programmed into a knowledgebase, it is available to be used and reused thousands of times by individual users.

For the program processor to act on the software engineering language (SEL) instructions to process the standard scripts, it must be provided with a set of application requirements. The application requirements are accumulated by the prototyper 12 or some other facility and are stored in the requirements database 13. A data dictionary stored with the requirements database identifies the data elements so that the program processor can utilize the stored values to control the script generation process.

Once a knowledgebase and an associated application requirements database exist, the program processor can be used to access the stored programming knowledge to generate the application script units to meet the stored requirement. The script generation process begins when the program processor unit is started on a specified knowledgebase. SEL instructions in the knowledgebase may initialize the program processor then instruct the program processor which requirements database to use, which output file to create, and optionally which previously generated output file to coordinate with to bring forward user added changes to the new output file.

Once the flow of statements from the knowledgebase is started, it continues until the end of file is reached on the knowledgebase or some SEL instruction switches knowledgebase processing to a different knowledgebase. Any knowledgebase can switch the flow of knowledgebase statements to any other knowledgebase file. This arrangement of knowledgebases is referred to as "nested" knowledgebases. Knowledgebases can be nested to 10 levels in a particular exemplary embodiment.

When an SEL instruction is encountered that opens a requirements database, the application database is read into the computer's memory. The data dictionary component of the database is read into an internal symbol table which is used by the program processor to resolve references to application requirements used in SEL statements. Requirements databases can be nested to 10 levels in the aforementioned exemplary embodiment to support dynamic switching of application requirements databases to supply knowledgebase programmed needs.

Some mechanism must be used in a knowledgebase to separate SEL statements from the process scripts they control. Techniques used by the present invention include a fixed format where the SEL component is prefixed or suffixed to the script component on each separate line of output, or a variable format where the SEL components are on separate input line(s) from the script component. The latter format is the preferred format. The mechanism used to distinguish SEL statements from the process scripts could be some unique character (such as a period) entered as the first character on a line.

The major purpose of the program processor 15 is to flow or transfer process script from the currently opened knowledgebase file 14 to the currently opened output file 16. Unless the program processor is put into some internal state that impedes this process, each line of input script is written directly to the output file. Several SEL mechanisms can be programmed to provide knowledge-based editorial control over this process.

The most common script change that is requested is to substitute a requirements database value where a requirements database variable is used in the knowledgebase script. The substitution can be made in a SEL statement or in the process script itself. If the change is made to the SEL statement it provides a way to modify the script generation process, whereas if it is made to the process script it individualizes the script to the user requirement. Such parameter substitution in SEL statements is to communicate knowledgebase file names, requirements database file names, output file names, coordinated file names, etc., and to substitute other process names or values. The variety of parameter changes made to process script is too numerous to mention. A special knowledgebase coding construct is used to parenthetically specify a replacement name parameter in such a way that the parameter is not confused with ordinary knowledgebase script.

The program processor is like a state machine in that it can control and change its internal values. Some states are controlled only by the program processor and are not available to the user. Other states (memory locations) are user specified and user controlled. Such states are used to store intermediate variables (numeric, logical and character string values) that are used to control the script generation process or to be generated into output scripts. The program processor can be programmed by SEL statements to store such variables internally, and to operate on these values to modify them or to create other internal variables. An arithmetic unit is provided to operate on numeric variables, which provides an SEL ability to add, subtract, multiply, divide, and perform modulo operations. A logical unit is provided to operate on logical (true or false) variables, which provides an SEL ability to perform logical product (AND), logical sum (OR), logical exclusive OR (EOR) and complement (NOT) functions.

The operation of all SEL statements and associated script processes is potentially conditional on the requirements database or the current internal states of the program processor. The SEL statements (IF and ELSE) used alone or with the block construct (DO and END), set the conditions on which a single knowledgebase statement or block of statements are operated. If the condition is met, the normal operations specified by the statement or block are performed; otherwise, the statement or block is ignored. This is the mechanism used to perform conditional script processing, based on either the requirements database values or the internal states (internal variables) of the program processor.

Some SEL instructions are provided to control the order of execution of statements from the knowledgebase. Typically, the execution order is the sequential order of the statements in the knowledgebase. Many times it is necessary to process a knowledgebase statement or statement block a varying number of times depending on information stored in the requirements database or stored internally in the program processor. For example, a given block of knowledgebase statements might be repeated for each row of a table or for each member on a threaded list. There are special SEL control statements to provide for situations like this.

Therefore, it is shown that the program processor is like an intelligent filter in "composing" a specific program from the generic knowledgebase, allowing certain knowledgebase inputs to flow through to its output processes without change. Other inputs are changed with replacement values provided by the application requirements database inputs or internal values stored within the program processor. Other output scripts can be conditionally generated based on the application requirements database values or the internally stored values, while other scripts can be repetitively generated to process table entries or list members. All output script processes can be coordinated with previous generations of the same scripts to provide regeneration of user generated script.

SEL is an evolving computer language directed toward the process of generating text scripts used to control computer processes; i.e., computer programs, functions, class objects, procedure files, process control scripts, etc. SEL instructions are programmed into knowledgebase files interspersed with computer process scripts that connote a standard computer process.

The SEL command lines in a knowledgebase are prefixed with a period character. This distinguishes SEL command lines from script lines. Knowledgebase script lines are conditionally output to the current output file and may contain replacement parameters that are replaced with application requirements database values or values stored internally within the program processor. The SEL programming language is similar to most high-level computer programming languages and provides programming constructs for specifying assignment, looping, conditional operations and input/output statements.

A SEL expression is composed from numeric constants, string constants, numeric or string variables, and structures or structure elements. SEL uses the following expression operators:

| (expression) | = controls evaluation order |
|---|---|
| −term | = unary minus |
| \term  ^term | = unary not |
| \|\| | = string concatenation |
| = | = equality comparison |
| > | = greater than comparison |
| < | = less than comparison |
| <>  >< \= ^= | = inequality comparison |
| <= \> ^> | = less or equal comparison |
| >= \< ^< | = greater or equal comparison |
| * | = multiplication |
| / | = division |
| // | = modulo |
| + | = addition |
| − | = subtraction |
| & | = logical and |
| \| | = logical or |
| && | = logical exclusive or |

With the foregoing in mind, the following provides examples of SEL expressions and statements which can be used in constructing a particular knowledgebase. It is noted that these statements are only exemplary, and that additional detail on the statements, statement formats, types of statements, and the like is included in the Technical Appendix included herewith.

A SEL expression takes the form of:

[<variable> | <constant>]<operator> <variable> | <constant> where

[] is an optional entity, and
| means OR

A SEL statement takes the form of:

variable=expression

The SEL statement grouping construct is:

DO
any knowledgebase statements
END

The SEL conditional statement is:

| IF expression | condition execution |
|---|---|
| any knowledgebase statement or statement group | |
| ELIF expression | else if statement |
| any knowledgebase statement or statement group | |
| ELSE | |
| any knowledgebase statement or statement group | |
| where the .ELIF and ELSE are optional entries | |

SEL input/output statements are:

| OUTPUT filename | creates output file |
|---|---|
| APPEND filename | appends to output file |
| INPUT filename | selects a knowledge file |
| RENAME oldfilename newfilename | |
| COORDINATE filename | coordinates with previous output file |
| DATABASE filename INTO variable | selects an APP database |

SEL knowledgebase looping control constructs are:

| FOR variable FROM link | loops with structures from the database |
|---|---|
| any knowledgebase statement or statement group | |
| FOR table | loops with table entries |
| any knowledgebase statement or statement group | |

Figure 2A:
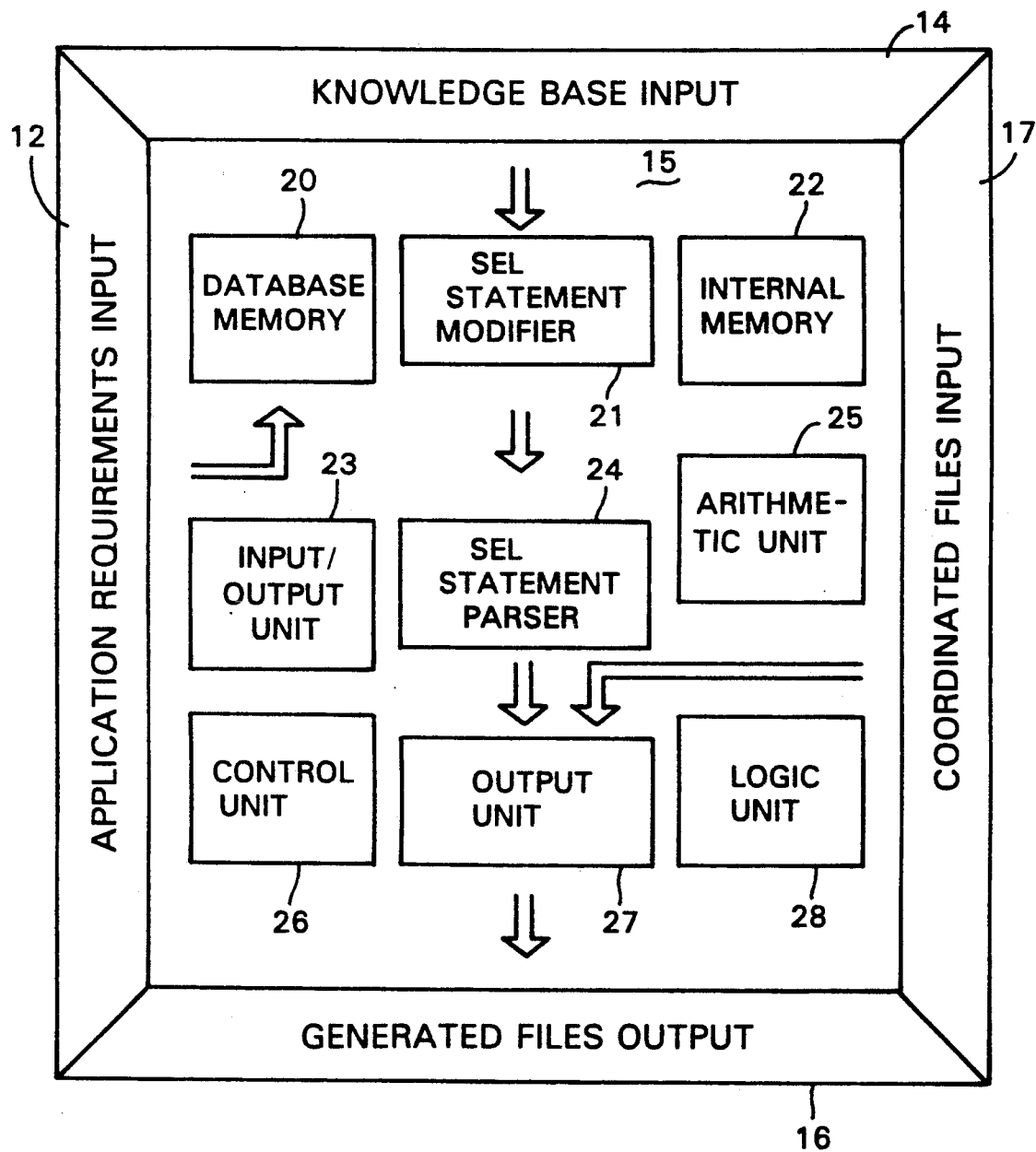
FIG. 2a is a block diagram illustrating the functional elements which form the program processor of the system of FIG. 1.

FIG. 2a is a block diagram illustrating the functional elements which form the program processor of the system of FIG. 1. The diagram shows the principal flow of information from the knowledgebase input 14, through the program processor 15, to the output files 16. The knowledgebase input 14 to the program processor 15 is shown at the top of the block diagram. The SEL and code script statements stored in the knowledgebase 14 are read into this input where they are first processed by the statement modification unit 21. If the SEL or program script statements contain substitution parameters, they are replaced with values from the requirements database memory 20 or the internal memory 22. The resultant statements are then presented to the SEL Statement Parser 24. The statement parser 24 separates the SEL statements from the code script statements and, depending on the state of the program processor, forwards the code script statements to the Output Unit 27. The output unit 27 writes the code script statements to the current output file 16.

The SEL statement parser 24 separates the SEL statements from the process script statements and directs the SEL statements to one of the program processor internal processing units; i.e., the Input/Output 23, Unit Control Unit 26, Arithmetic Unit 25, or Logic Unit 28. These program processor units evaluate their respective SEL statements and control the internal workings of the program processor. The program processor contains two kinds of long-term memory that are defined during knowledgebase processing. One memory, the Database Memory 20, is a store for the current application requirements database 13. The requirements database information that is stored in this memory is defined by an internal symbol table which is derived from the data dictionary stored in the application requirements database. A second kind of memory is the Internal Memory 22 which is built up during the processing of various SEL statements. Variables in this database are also defined in the program processor symbol table. The symbol table is used to lookup SEL and code script variables referenced from knowledgebase statements.

The Input/Output unit 23 is used to control all SEL programmed input and output functions. Certain SEL statements can cause input switching from one knowledgebase 14 or requirements database 13 to another, pushing the newly referenced entity onto an internal stack. This permits knowledgebase or requirements database processing to be nested. Other SEL input/output statements are used to control output files that receive the generated code scripts from the program processor output unit. Then, other SEL input/output statements identify previously generated output files to coordinate their internal statements with the current output file being generated. This is done to permit user-added code scripts (to a previous version of the output file) to be transposed to the new output files. Through other SEL input/output statements, output files can be renamed or deleted.

The Arithmetic 25 and Logic Units 28 process SEL assignment statements that form arithmetic or logical results from expressions using constants or variables stored in either the database memory 20 or the internal memory 22. A fundamental design tenet of the exemplary program processor 15 is that the database memory 20 is inviolate, therefore the result of any SEL assignment statement can only be stored in the internal memory 22. This may mean that values must be moved from the database memory 20 to the internal memory 22 before they can be changed, but it also insures that requirements database values remain unchanged. The results of SEL expressions can be used in subsequent SEL expressions and/or used to condition output code generation operations.

The Control Unit 26 processes those SEL statements that cause looping or reuse of knowledgebase statements or statement groups. Two types of SEL looping instructions are supported, one supporting tabular data structures and the other supporting linked data structures. The control unit 26 causes reuse of a given knowledgebase statement or block of statements for each member in a named data structure. The table type of SEL instruction processes each member of a given data table, indexing through the table to process its variables which are referenced by the SEL and code script knowledgebase statements in the specified block. The linked structure type of SEL instruction processes a hierarchy of linked structure members, of varying types, selecting each linked member of the particular type, and processing its component variables which are referenced by the SEL and code script knowledgebase statements in the specified block.

Figure 3:
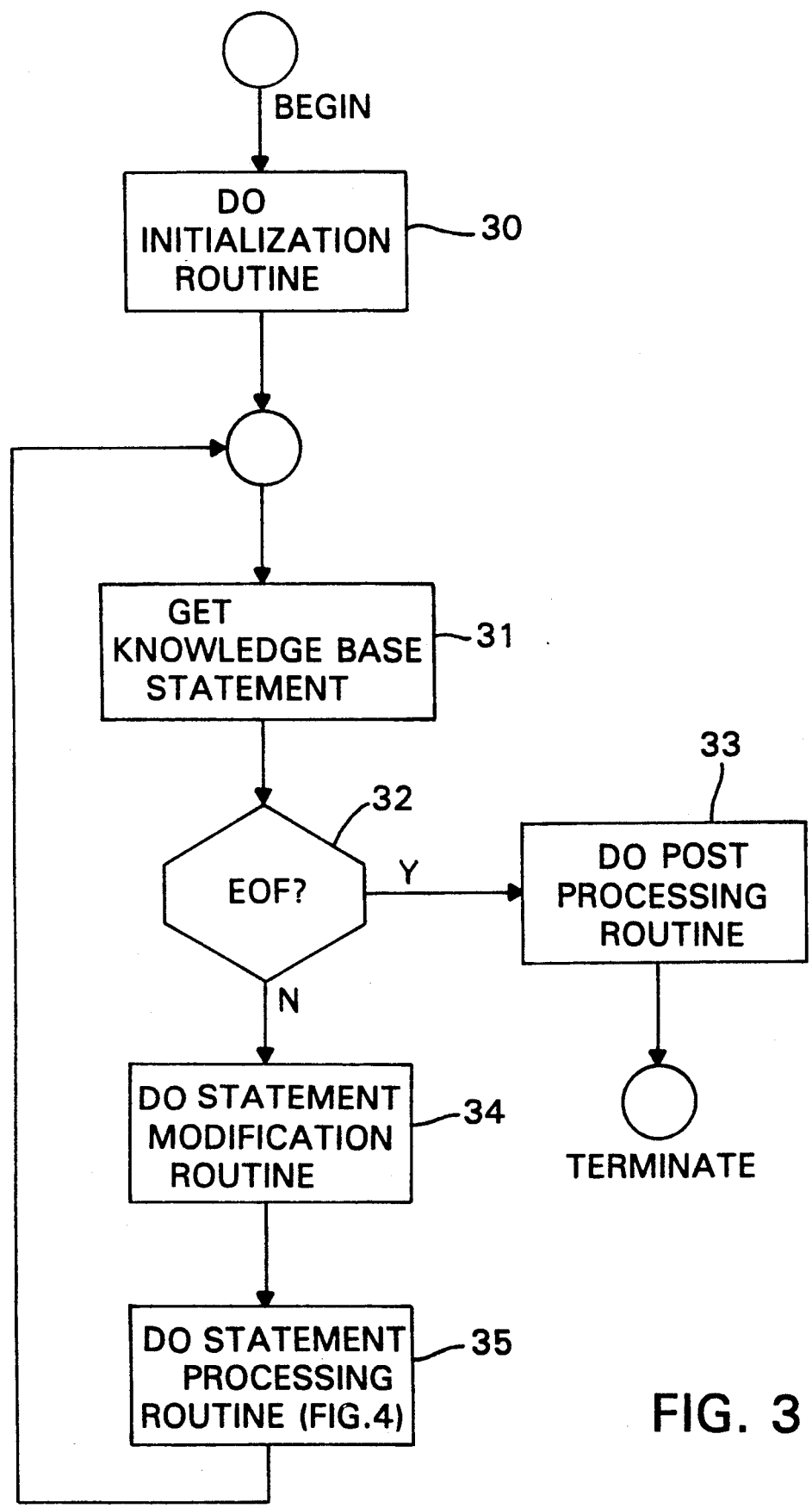
FIG. 3 is a flowchart illustrating a process for producing an output program code file in the practice of the present invention.

Turning now to FIG. 3, there is shown a flow chart representation of the PROGRAM PROCESSOR of the present invention. The PROGRAM PROCESSOR initially begins with step 30 where the initialization of the process occurs. The name of the knowledgebase to use and other initialization parameters are passed to the PROGRAM PROCESSOR as a part of its calling sequence. These values are used to open the knowledgebase and prepare it for processing. Step 31 reads the next knowledgebase statement from the current knowledgebase, unless the end of file is reached on the knowledgebase. Step 32 checks for the end of file condition, and if the end of file condition is met, initiates step 33 which performs the post processing routine. If the knowledgebase is not at the end of file, step 34 is used to examine the input statement and insert requirements database memory values or internal memory values into the knowledgebase statement anywhere there are SEL substitution parameters. Thus SEL statements or program script statements are modified in accordance with any specified requirements database values or process variables. Step 35 is then used to process the resultant knowledgebase statements (FIG. 4).

Figure 4:
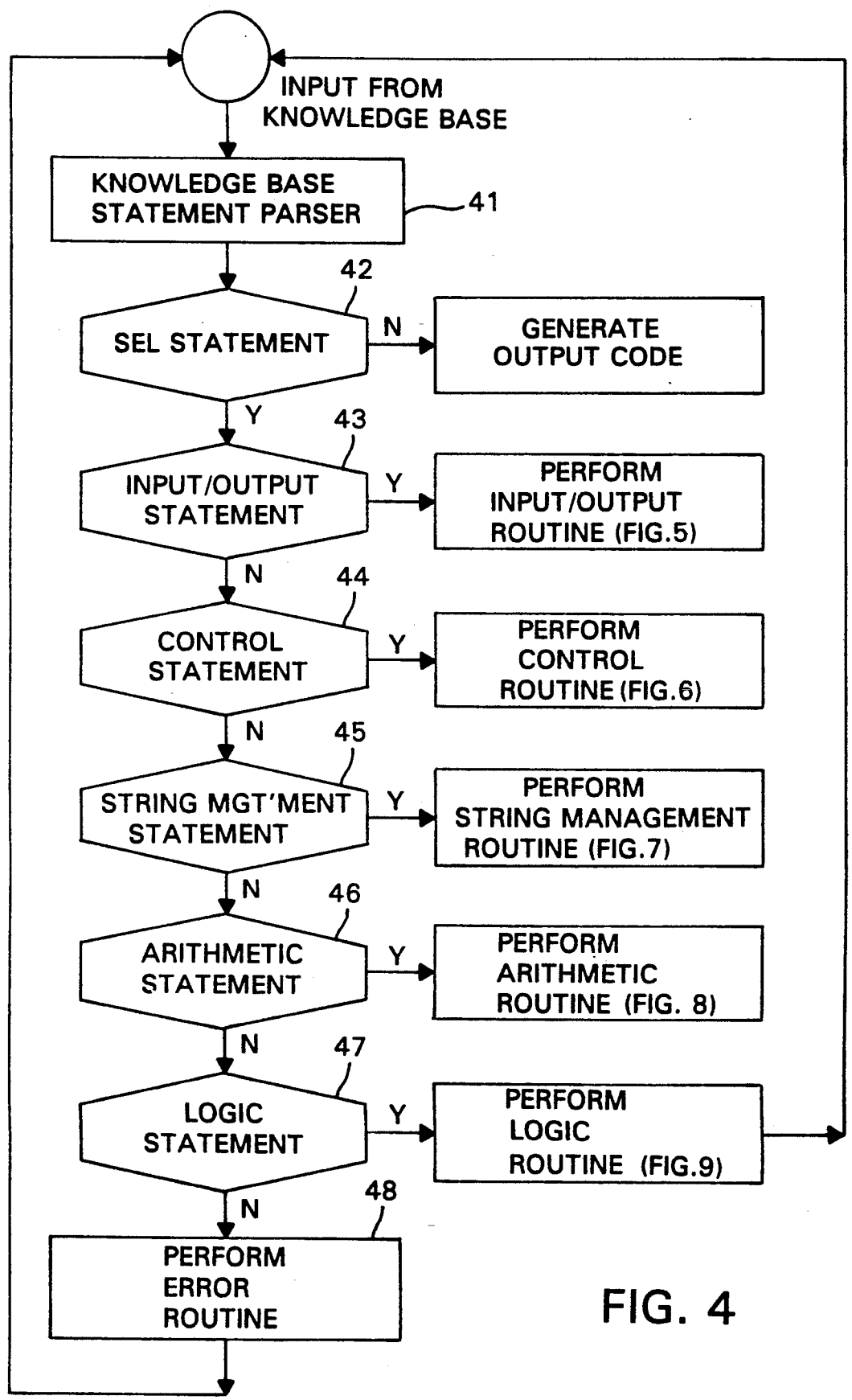
FIGS. 4–9 are flowcharts illustrating routines for use in the process of FIG. 3.
Figure 5:
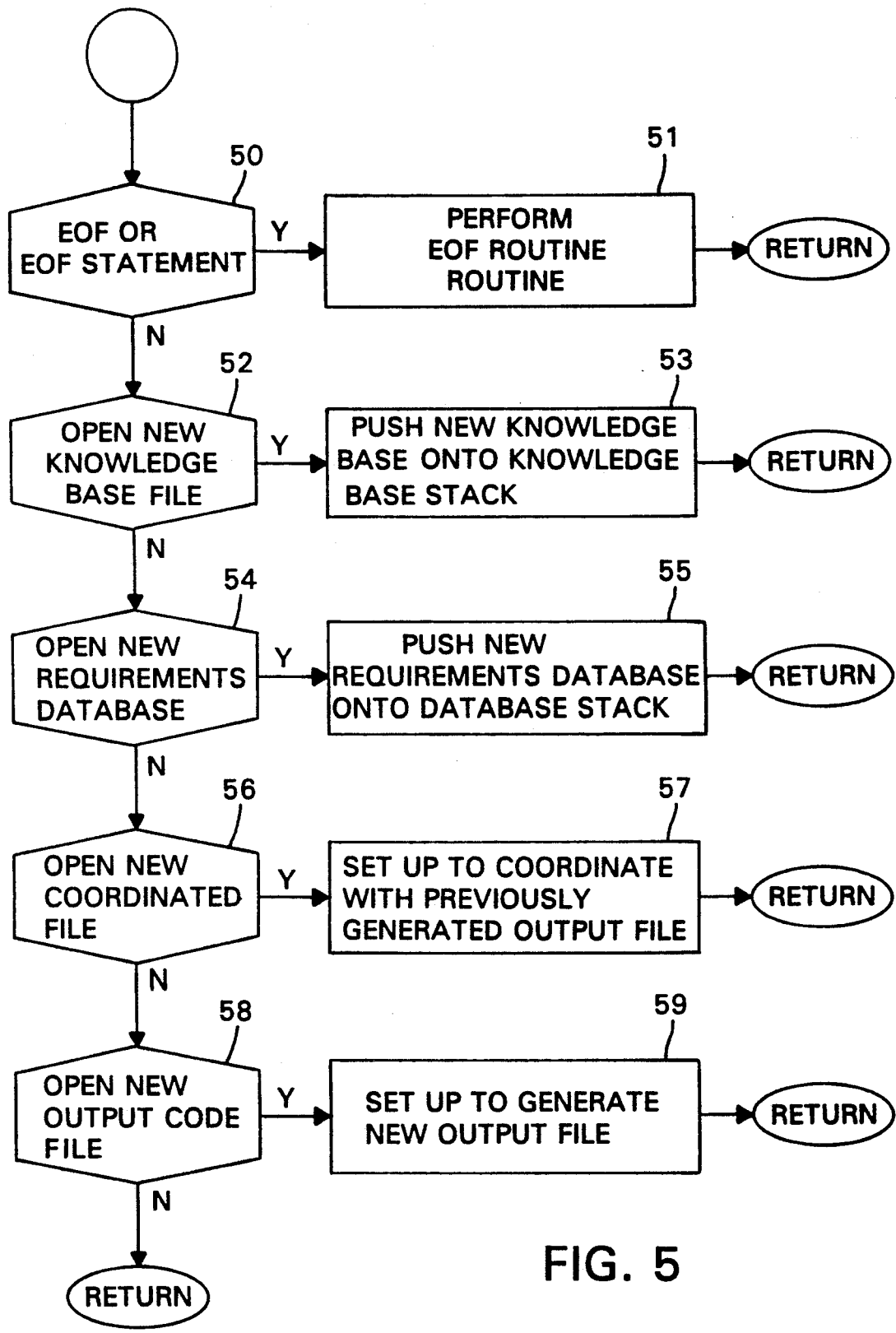
Figure 6:
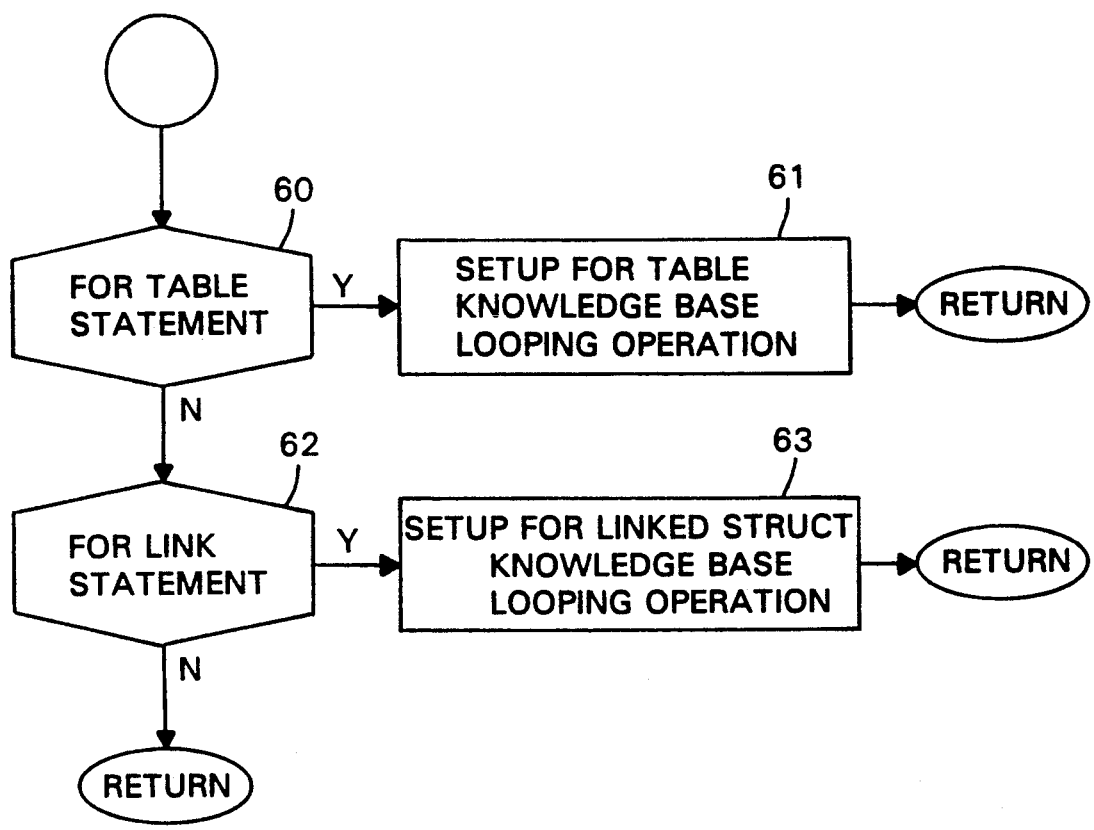
Figure 7:
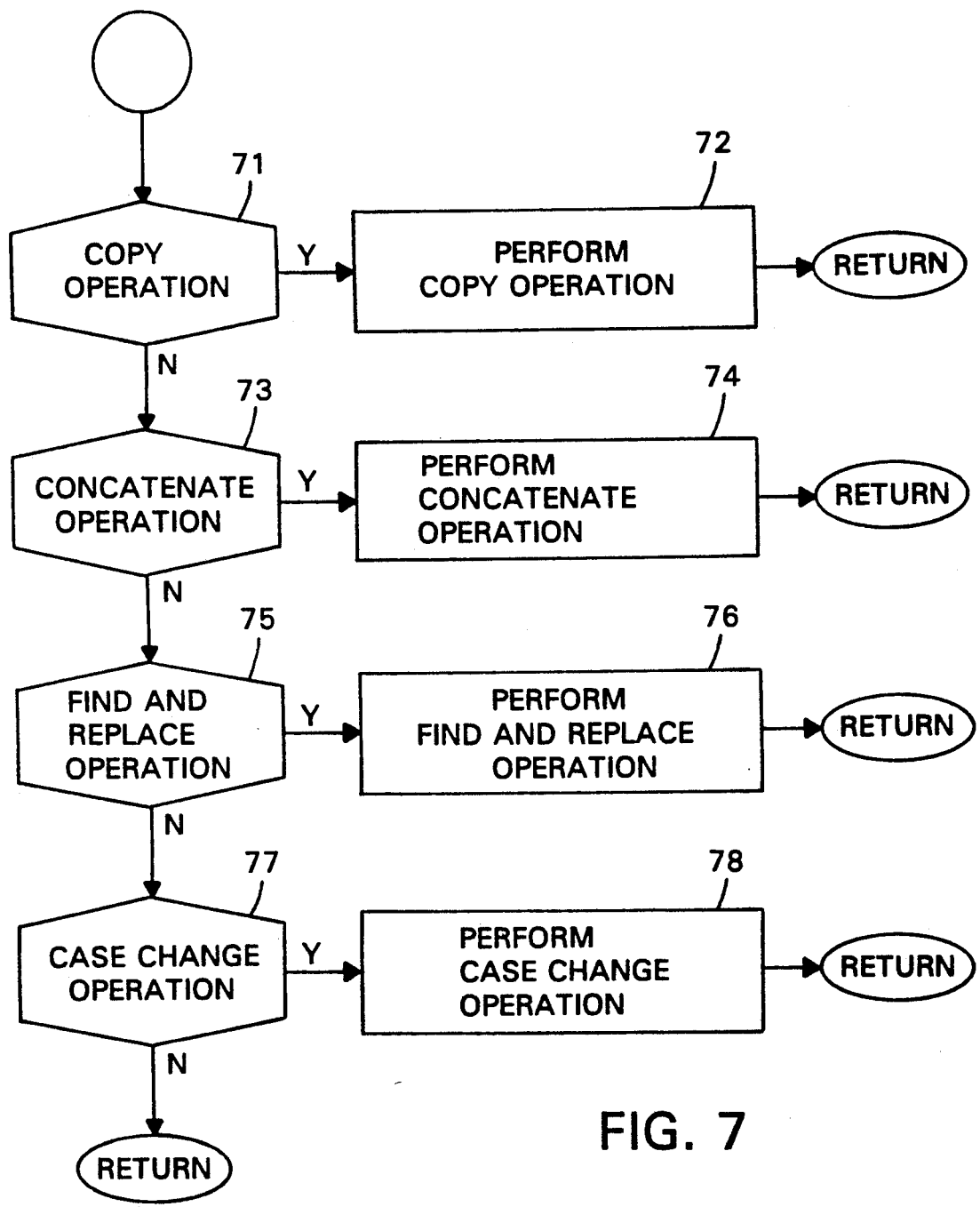
Figure 8:
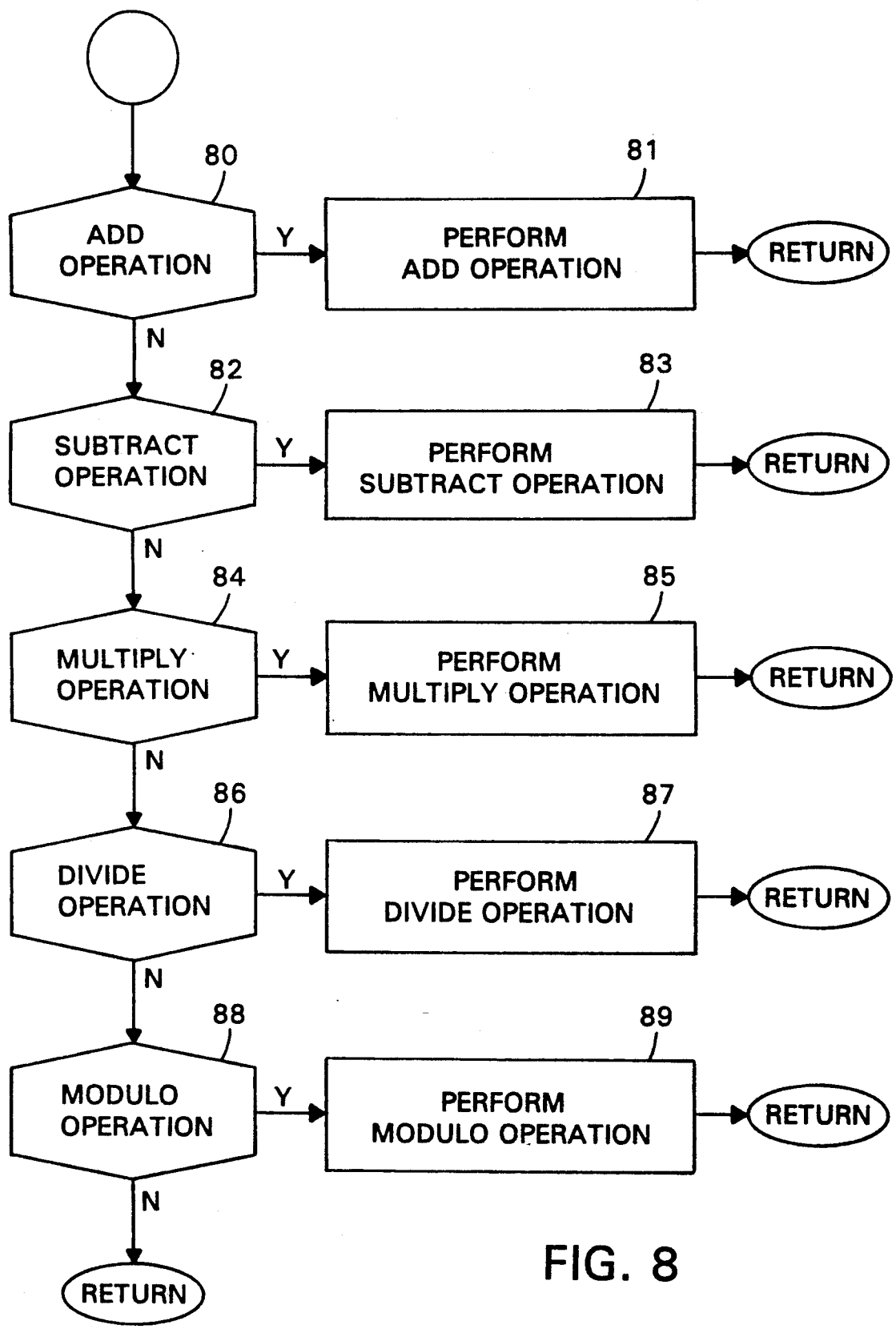
Figure 9:
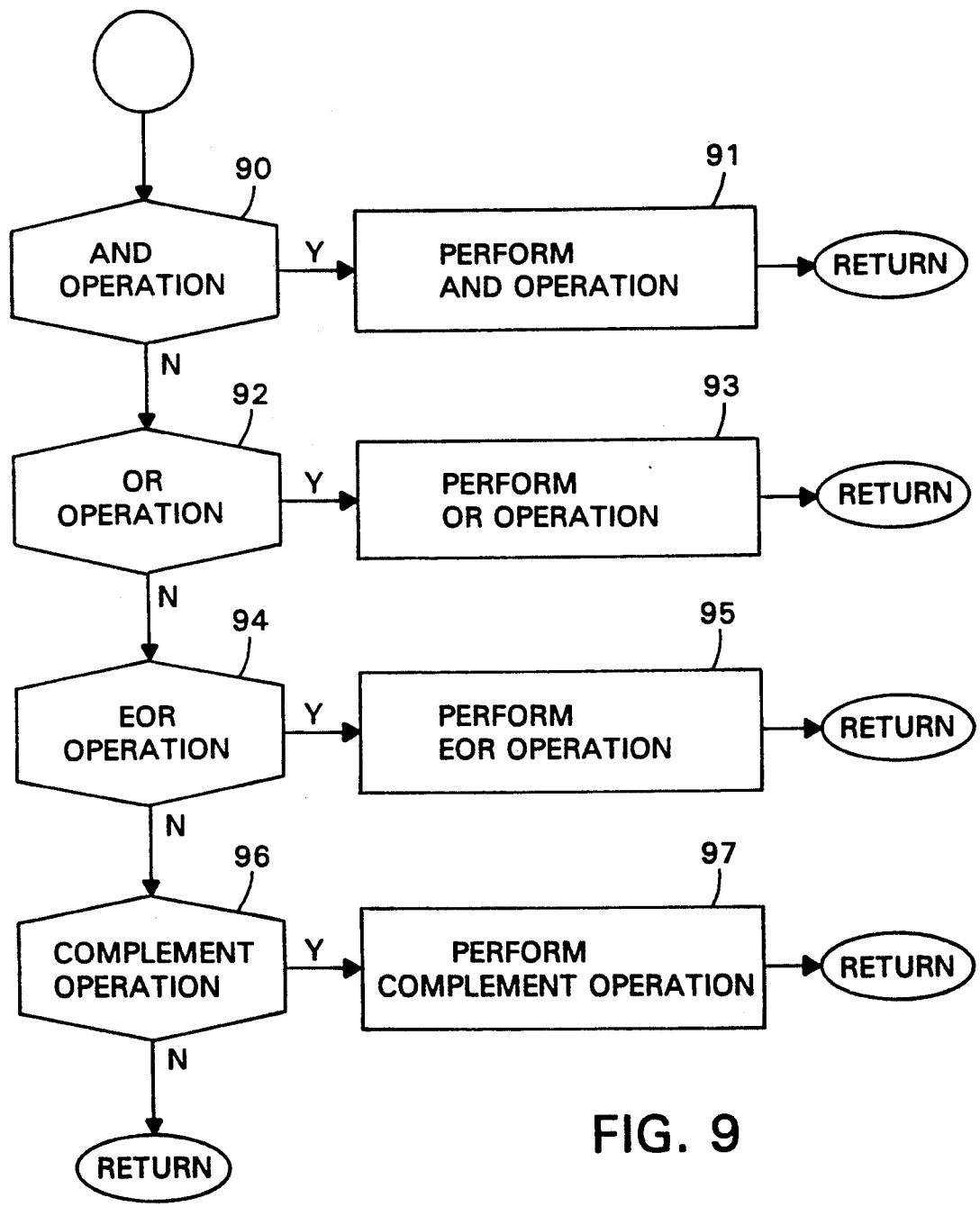

The STATEMENT PROCESSING ROUTINE as shown in FIG. 4, is performed for each knowledgebase statement. Step 41 separates the SEL statements from the code script statements and parses the SEL statements into their component parts for further processing. Step 42 directs the code script statements to the output process, while the following steps direct the SEL statements to their respective processing units. Step 43 directs input/output statements to the INPUT/OUTPUT ROUTINE (FIG. 5). Step 44 directs control statements to the CONTROL ROUTINE (FIG. 6). Step 45 directs string management statements to the STRING MANAGEMENT ROUTINE (FIG. 7). Step 46 directs arithmetic statements to the ARITHMETIC ROUTINE (FIG. 8). Step 47 directs logic statements to the LOGIC ROUTINE (FIG. 9). Step 48 detects statements that cannot be otherwise recognized and directs them to the ERROR ROUTINE.

The INPUT/OUTPUT ROUTINE as shown in FIG. 5, is called by the SEL statement parser when an input/output statement is encountered in the knowledgebase input stream. Step 50 detects a physical end of file for the current knowledgebase or the presence of an SEL force end of file statement. If an unconditional force EOF statement is encountered, or a conditional force EOF statement for which the conditions are met is detected, then the EOF ROUTINE (step 51) is operated. The EOF ROUTINE pops the current knowledgebase from the knowledgebase stack. If the current knowledgebase was the top of the stack (i.e., the primary knowledgebase), then the PROGRAM PROCESSOR is finished and the POST PROCESSING ROUTINE is operated. Step 52 detects SEL statements that open knowledgebases and pushes the new knowledgebase onto the knowledgebase stack, step 53. All knowledgebase inputs are then received from the new knowledgebase. Step 54 detects SEL statements that open requirements databases and pushes the new requirements database onto the requirements database stack, step 55. Step 56 detects SEL statements that open coordinated files and sets up output generation, step 57, to coordinate with the previous versions of the output files. This opens the previous version of the output file to coordinate its internal statements with the current version being generated. Statements will be read from the coordinated file and compared to the next output statement to be generated. Statements that are different are recognized as statements added to the previously generated file by the user. Such statements are copied to the new output code file, preserving the statements previously added by the user. Step 58 detects SEL statements that open output code files. If the previous output file was not closed, it will be closed implicitly before the new output code file is opened. The newly opened output file will be the recipient of the generated and coordinated output codes until the output file is changed again.

Turning now to FIG. 6, there is shown the CONTROL ROUTINE which is called for SEL statements that cause knowledgebase control actions; i.e., statements that cause reuse of the statements (SEL statements and program script statements) stored in the knowledgebase. This makes it unnecessary to repeat statement patterns within a knowledgebase, and provides a way to iterate multi-unit, requirements database and internal memory structures to substitute their values in each repeat of a given knowledgebase unit. Two types of data structures are supported—table or array units and linked structure units. Tables and arrays are two-dimensional data structures stored as successive rows of associated data values arranged under named column entries. Linked data structures are arrangements of named data items (a structure) linked with each other in hierarchical chained lists. SEL provides two statement types to operate the two types of data structures. Step 60 detects the SEL statement causing table processing and transfers control to step 61, which sets up for looping the knowledgebase for each row in a data table. Step 62 detects the SEL statement causing linked structures processing and transfers control to step 63, which sets up for looping the knowledgebase for each named structure type in a linked list of data structures.

The STRING MANAGEMENT ROUTINE as shown in FIG. 7, is called by the parser for each SEL string handling statement. String operations can be performed on strings stored in the requirements database memory or the internal memory; however, the results of such operations can only be stored in internal memory. Strings formed in the internal memory can be generated into output code statements. Step 71 detects SEL string copy statements and transfers control to the copy operation, step 72. A string in either the SEL statement, requirements database memory or the internal memory can be copied to the internal memory. Step 73 detects SEL concatenate statements and transfers control to the concatenate operation, step 74. A string in either the SEL statement, requirements database memory or the internal memory can be concatenated with a string in the internal memory. Step 75 detects SEL statements that cause find and replace operations. A string in either the SEL statement, requirements database or the internal memory can be searched for within an internal memory string and can be replaced with a value specified in either the SEL statement, requirements database memory or the internal memory. Step 77 detects SEL statements that perform case changes on internal memory strings. Strings in internal memory can be made all upper case or all lower case, depending on the SEL statement.

Turning now to FIG. 8, there is shown the ARITHMETIC ROUTINE which is called by the parser for arithmetic assignment statements. Step 80 detects addition operations involving either constants, requirements database memory variables or internal memory variables and stores the results in internal memory, step 81. Step 82 detects subtraction operations involving either constants, requirements database memory variables or internal memory variables and stores the results in internal memory, step 83. Step 84 detects multiplication operations involving either constants, requirements database memory variables or internal memory variables and stores the results in internal memory, step 85. Step 86 detects division operations involving either constants, requirements database memory variables or internal memory variables and stores the results in internal memory, step 87. Step 88 detects modulo arithmetic operations involving either constants, requirements database memory variables or internal memory variables and stores the results in internal memory, step 89.

The LOGIC ROUTINE shown in FIG. 9 is called by the parser for logical assignment statements. Step 90 detects logical product (AND) operations involving either constants, requirements database memory variables or internal memory variables and stores the results in internal memory, step 91. Step 92 detects logical sum (OR) operations involving either constants, requirements database memory variables or internal memory and stores the results in internal memory, step 93. Step 94 detects logical exclusive or (EOR) operations involving either constants, requirements database memory variables or internal memory variables and stores the results in internal memory, step 95. Step 96 detects the complement logical operation and performs the operation on a value stored in internal memory, step 97.

While in many respects it may be redundant, following is a functional specification of a system exemplifying the present invention. It is noted that the program processor is described in this technical appendix as an inference engine operating in connection with an expert system. It will be appreciated from the foregoing description that the program processor is a true program processor intended to process program script in accordance with SEL instructions, and thus its description as an inference engine is by analogy only. However, the following appendix is intended in certain respects to further characterize a system constructed in accordance with the invention in language which will be familiar to those skilled in this art and which will complement the detailed technical description given above. While it is believed that the foregoing detailed description will be adequate for one skilled in this art to practice the present invention, the following appendix is intended simply as a supplement illustrating one embodiment of the invention.

APPENDIX

Expert System Code Generator

The Expert System is a general purpose software State Machine that is used to produce expert-level source code routines and/or complete programs from a stored Knowledgebase 14 and an Application database 13 (a high-level requirements specification). One technique that is used to develop an Application database is to use a Prototyper program 12 to carry out a dialogue with a developer to accumulate design details for the desired computer routine or program. The Inference Engine 15 is then used to process the design specification against a stored Knowledgebase of programming information to produce concise, well structured, fully commented program code files and other kinds of code files and production files.

The Inference Engine 15 operates with three sources of inputs: an Application database 13, a Knowledgebase 14, and a set of Coordinated files 17. The Application database is a single file produced by a Prototyper or some other requirements generator program. The Knowledgebase is a collection of files that store the code patterns that define a software process and the production rules that govern the code generation process. The Coordinated files are a set of code files, previously generated by the Inference Engine, but whose contents may have been modified by a user. The Inference Engine coordinates its Knowledgebase and the Application database with this (possibly modified) set of input files to carry forward the added code patterns to the new, generated output files.

Knowledgebase

The Knowledgebase is a specially constructed file that describes specific programming knowledge about a software routine or program. It also contains stored instructions for the Inference Engine that change its internal states and that direct its actions. The outputs of the Inference Engine are the required program files and production files used to build a computer program or application.

Application Database

The Application database is a collection of various kinds of tables used to control and facilitate the Inference Engine's output code line assembly processes. It contains tables of string values, integer values, and logic values that define the specific variables or requirements for one generated instance of a computer routine or program.

The Application database string values are file names, field names, words, phrases, etc., that are collected and stored by the Prototyper, and are used in the Inference Engine's string management instructions that assemble output code lines. The integer values are counts, loop controls, array sizes, constants, or other integral values that can be generated into the output codes or to instruct the Inference Engine in manufacturing codes. The logical values are stored TRUE and FALSE (1 and 0) values that are primarily used to control code line generation, but can also be generated into code lines.

Coordinated Files

As program requirements change, new designs will be prototyped and generated with the Inference Engine. Since the last generation of the program files, the developer will most likely have added additional code lines to one or more of the generated program files. Some method is needed to regenerate these added codes into the new versions of the output files.

The Coordinated files are a previous generation of output code files produced by the Inference Engine. The Inference Engine coordinates the generation of its new output files with their previous versions to transcribe all user added codes.

The Programming Problem

The "art" of writing computer programs has long been recognized as an activity requiring the skills of "expert" programmers that are trained in the rules of constructing "correct" code sets modulated according to the requirements of some application or need. This requirement for a high degree of skill to produce programs is unduly expensive and time consuming. What is needed is a technique of using the computer itself as an "expert" in the process of producing computer programs.

Expert Systems

The Computer Science of Expert Systems is a useful approach. An Expert System, as used herein, is a computer program incorporating a Knowledgebase (collected wisdom about some particular field of expertise), a problem Database (information about a problem to be solved), and an Inference Engine (a problem solver) that puts both sources of information together to realize a solution to the problem. Some of the benefits that have been derived from Expert Systems are:

They permit non-experts to do the work of experts.
They improve productivity by increasing work output.
They improve efficiency by expediting solutions.
They save time in accomplishing a specific objective.
They simplify complex operations.
They automate repetitive or tedious processes.

Current Programming Practice

The process used to write computer programs today begs consideration for each of the benefits provided by Expert Systems technology. Programming is both complex and time consuming. Much of the information programmers need to do their job is buried in a vast and comprehensive set of reference manuals. The information base is so extensive, programmers never really "know" it—they may spend a few minutes or even hours looking something up, only to repeat the process the next time the information is needed. Some method is needed to identify and specify information about processes once and an ability to recall the process each time it is needed.

Also, much of what is produced during the programming process is redundant. The same routines are programmed over and over, time and time again—many times with only minor changes. Concepts like program robustness (ability to function even in abnormal circumstances), modularity, extensibility and reusability are goals many programmers strive for; but, too often, they are forced to trade these benefits off for specific performance objectives such as reduced development time, increased processing speed, reduced program size, and other concerns.

The Expert System Code Generator

The Expert System can be applied to the process of writing computer programs, regardless of the user's program design style or the programming languages used. It is independent of the types and purposes of the input files it can be used with, and is independent of the types and purposes of the output files that it produces; i.e., it is equally able to produce program code files in any language (i.e., Cobol, Fortran, C, Pascal, etc.), and their associated job control files, make files, etc.

Using the Expert System entails the construction of a Knowledgebase that contains the code sets (patterns) that describe (as completely as possible) a computer program or process, and the instructions that tell the Inference Engine how to process these codes. The Knowledgebase is both a program and a source of data that is processed by the Inference Engine to produce the desired output code files and production files.

Some of the instructions programmed into the Knowledgebase files are used to control the operations of the Inference Engine itself. There are instructions to control and switch input sources (User Knowledgebases, Header files, Copyright Notice files, etc.), to control and switch output files (Code files, Header files, Script files, Job Control files, Make files, etc.), and to manage files stored on the disk (Delete files, Rename files, etc.)

Some of the Knowledgebase instructions are used to operate on internal values stored within the Inference Engine itself. There are instructions that perform arithmetic operations, that perform logical operations, and that replicate (perform repetitive operations on) particular blocks of input data.

The Inference Engine can also be used to coordinate its input Knowledgebase files with previous versions of its generated output files to bring forward user-added codes into new versions of its output files. This provides a powerful code management facility that makes it unnecessary for a user to have to re-edit and re-insert information into the generated output files.

The primary purpose of the Knowledgebase files is to record code patterns that are to be generated into the output files under specified conditions. These code patterns are prefixed with inference rules that specify the conditions under which the codes will be generated into the output. This is the technique used to select one program method over another dependent on the given situation (Prototyper Database input).

Finally, the code patterns themselves can contain formatting specifications to cause substitution of Prototyper (Database) inputs into the generated codes. This is the method used to specify variable parameters in input code lines; for example, to supply a name, a numeric value, a string value, etc. to be generated into an output statement. The technique used closely resembles the formatting characteristics of the printf function familiar to most C programmers.

The Expert System can then select the appropriate Knowledgebase file, process its code sets, and automatically program each of the output statement's parameters according to the user needs specified in the Prototyper generated Database. Program code sets can be selected from a number of sources (Knowledgebases), modified by the Database of requirements, replicated when it is appropriate, coordinated with previous generations of the output files, and generated into a number of different output files.

The Inference Engine

The term Inference Engine (IE) will be used to describe a highly versatile, externally programmed, general-purpose, automatic, software state machine. The IE is this type of machine. It is equipped with internal storage registers, control registers, and a processor (or interpreter) of instructions which it uses for its own internal and external operations. In what follows we will deal with three basic issues regarding the IE: What it, what it does, and how it is controlled.

The IE is automatic only in the sense that, after being presented with its input, it can operate upon that input to produce the desired output result without further intervention by any human operator. It operates in this manner by means of its program, which selects the sequence(s) in which its internal operations will actually be carried out in order to solve a specific problem.

If its repertoire of operations is suitably versatile, a machine may be judged to be general-purpose by the degree of ease with which its program can be changed. The IE receives its program from the same source as one of its data sources, a Knowledgebase. Instructions in the Knowledgebase can be used sequentially and repetitively, and can be switched between a large number of Knowledgebase files.

Information about the particular problem to be solved is entered via the Application database input. This information is read and stored within the IE data store where it is used to particularize the routine or program stored in the Knowledgebase to realize a new routine or program.

A third input to the IE is a Coordinated file mechanism. This mechanism provides for the input of previous results so that the changes that have been made to the previous results can be propagated to the newly generated outputs.

Functional Description

Figure 10:
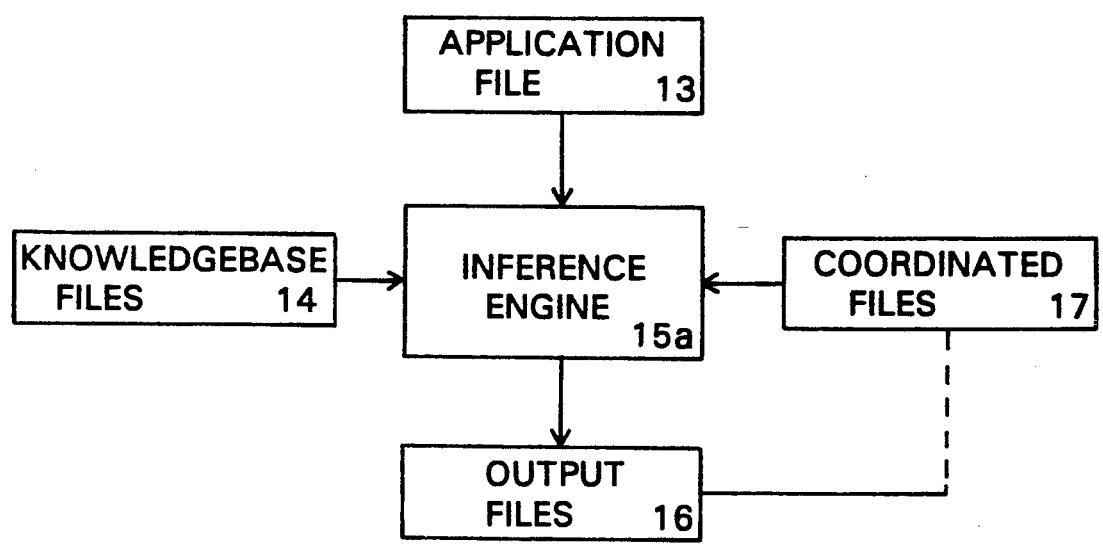
FIG. 10 is a diagram, similar to FIG. 1, illustrating the interrelationship of the elements of the invention.

In solving a given problem the IE performs the functions of input of its program, input of program code patterns, input of coordinated program code information, input of information about the application requirements, storage of input and derived information, control, arithmetic, logic, and, finally, output of automatically generated program code information. These are all indicated in FIG. 10, a block diagram illustrating the IE.

INFERENCE ENGINE

Input-Output

The IE 15a receives input from a number of sources. These sources are grouped according to function. One input is a file of specifications and requirements stored in an Application database 13. Another input is results of a previous use of the engine, where it is desired to introduce added changes to the new outputs. The primary input comes from a Knowledgebase 14, which contains the IE's program and the program code information to be operated upon.

In its repertoire the IE has instructions for opening, closing, seeking, reading, and switching between Knowledgebase files, and for opening, closing, writing, and switching between output files. Likewise, it can control its use of Coordinated input files. The Application database is a static source of input information that is read and stored within the IE data store on initialization of the IE's operation. The Application database information is referred to as External information to distinguish it from temporary Internal information that is processed and also stored within the IE.

The IE is controlled by one master Knowledgebase file. It can be programmed with a complete program, including all operations in one file, or it can be programmed to direct the IE's input from other Knowledgebase files, or it can be programmed to perform using some combination of the two techniques.

The Knowledgebase files can be one of two access types, Sequential or Indexed. A Sequential file is nothing more than a normal text file as produced by a text editor. The lines or records in a Sequential file are accessed by the IE in a sequential fashion.

An Indexed Knowledgebase file is composed of blocks of one or more lines (units) that can be accessed randomly from a parent Knowledgebase file. The IE has a built-in indexing facility to index a properly formed (for indexing) Knowledgebase file and to store the index as part of the file. Provision is made within the IE to process an Indexed Knowledgebase file's index and permit direct access to its units Another facility built into the IE permits encrypting and decrypting Knowledgebase files for security purposes.

A basic Knowledgebase file 14 is composed of purely text information of two types: the program for the IE and the program code information to be operated upon. The Knowledgebase files can be prepared using any ordinary text editor program that stores data in lines separated by newline (carriage return, line feed) characters. The Knowledgebase files have a file extension value of KNB.

The Application database file 13 is composed of a header record and three sets of information tables. The header record identifies the Application file and specifies the size and locations of its stored tables. There are three tables stored in the Application file, referred to as the Strings Table, the Integers Table, and the Logics Table. These tables pass along information collected and stored by another process or program; typically a prototyper program which prompts for and saves information provided by a user (developer). The Application file has a file extension value of APP.

The Coordinated files 17 are simply previous versions of output files generated by the IE. These files will contain program codes and other kinds of information generated by the IE, plus program code additions entered into the files by the user. It is important that the user not modify the codes generated by the IE, as these codes are used in the regeneration process; that is, the IE uses these codes as markers to recognize and transpose the user added codes. The Coordinated files must have the same file names and extensions as was generated by the IE when they were first created.

In general, the operation of the IE is to first open its Application file (specified within its command line parameters) and to read the Strings Table, the Integers Table, and the Logics Table. It then opens its primary Knowledgebase (also specified within its command line parameters) and begins to read and process its instructions and program code information. Instructions in the Knowledgebase input (KNB) open the appropriate output files and write the generated output to them.

Other instructions from the KNB manipulate External information (String Table, Integer Table, and Logic Table values), Internal information (temporary String, Integer, and Logic table values), and the program code information input from the KNB. Inferences about which operations are to be performed can be based on any External or Internal value.

IE Storage

The function of the IE storage unit is to hold the IE's initial information, intermediate information, and final information before output. The storage unit of the CASEWORKS IE is composed of two types of stores (External and Internal) each containing three kinds of tables (Strings Table, Integers Table, and Logics Table) with each table containing a large number of individual members. These storage locations are totally addressable using the instructions of the IE. Other kinds of storage and memory (such as stacks, lists, temporary variables, etc.) are maintained by the IE, but are not directly available to the Knowledgebase programmer using SEL knowledgebase programming language.

The information in the Application database is read into the External data tables. This information cannot be changed by the SEL programmer. This information is the complete specification for the desired routine or function and remains static throughout the IE cycle. If changes to the values in the External store are required they can be moved to a suitable storage location within the Internal store where they can be operated upon.

There are SEL instructions that are provided to set or initialize values in the Internal store and to manipulate the stored values. Arithmetic can be performed. Counters can be incremented, decremented, and tested. Complex logical propositions can be computed, stored, and tested. A complete set of string operations is provided to copy, concatenate, and compare all kinds of string values. Formatting operations, similar to the sprintf function provided in the C language, can be used to manufacture internal strings and output code lines.

Control

It is the function of the control unit to obtain the instructions from the Knowledgebase in the correct sequence and to cause each instruction as obtained to be properly executed. In executing an instruction, the control unit decodes the particular mnemonic code representing the operation to be performed and sets up the proper function in the processing unit. The control unit also decodes the condition code and External and Internal operand fields in order to check the inferences (if any) and to arrange for transmission of operands from the assigned registers to the processing unit and vice versa.

In many operations the control unit will choose its next instruction in a sequential fashion from the current Knowledgebase, provided only that the current instruction does not specify some other order or some other Knowledgebase file. The control unit is capable of operating nested Knowledgebase files (files that access other files) up to 10 levels deep.

Control instructions are provided in SEL that permit the specification of SEL labels and repeat loops. Repeat loops can be nested to any level, and both direct and relative addressing of External and Internal table values is provided.

Virtually every SEL operation can be made conditional on values stored in either the External and Internal tables. Tests for equality (EQ) or any inequality condition (NE, LT, LE, GT, or GE) can be performed on any value. If the assertion or negation test is satisfied the operation is performed; otherwise, it is not.

Processing Unit

The IE Processing unit performs the operation specified by the mnemonic code if the tests performed by the control unit are successful. The type of operation performed may be arithmetic, logical, or string manipulation on the operands stored in the External and Internal tables. The results of processing may be transmitted to the output files or stored in the Internal tables. The IE has a few registers, stacks, lists, etc. that it maintains for its own operation that are not addressable by the programmer.

SEL Programming

The most significant step in using the IE is preparing the Knowledgebase code sets and the associated sequence of SEL (Software Engineering Language) instructions to describe a software process and the IE operations required to manufacture a routine or program from them. This task is usually called coding.

The best problems for a Knowledgebase solution are well-defined, commonly required program components or modules that are used in many different applications: program components such as user interface modules, database modules, communications modules, query and report modules, etc. It is possible to generalize these kinds of facilities into their own programs, but the result is programs that are too large, too slow, too unwieldy, and too difficult to create and maintain.

The IE Knowledgebase approach makes it possible for a SEL programmer to create modular, standardized, compatible, reusable, efficient, portable, versatile, code units possessing the power and flexibility desired, but that are capable of being generated into specific, concise, sound program units or complete programs. The resulting units are very fast, easy to use, easy to modify, and easy to regenerate and maintain.

Therefore, rather than code one specific instance of a process, over and over, each time one like it is needed, the SEL coder tries to generalize the solution to entertain as many variations of the process as can be visualized. Completeness is encouraged but is not absolutely required as the Knowledgebase is a dynamic entity, permitting additions, deletions, and corrections as experience is gained with it. The Knowledgebase is said to be extensible. Certainly, it is reusable. With experience it can be made more correct and more robust.

Description of SEL

The instructions in the SEL language take the form shown below:

| SEL Command | Code Line Operand |

The form of an instruction in SEL takes two basic parts—the SEL Command part and the Code Line Operand part. All instructions must have a SEL Command part, but may not have a corresponding Code Line Part. The SEL Command contains the complete instruction to the IE, and the Code Line Operand may contain a code line to be operated on. For some SEL instructions, the Code Line Operand is used to pass information to the IE.

The format of a SEL instruction is fixed to particular columns. A fixed format rather than a variable spaced format is preferred because it aligns the two parts shown above so that it is readily observed what is SEL Command and what is program code. This makes it very easy to read and work with using a conventional text editor program.

Imbedded SEL Remarks or Comments

The Code Line Operand field can include a Remark or comment statement at any position in the line. An embedded comment begins with a two character pattern, "//", similar to the comment format of the C++ language. Also, like C++, the comment extends from the double-slash characters to the end of the current line. For example, the following SEL statement contains a properly formatted comment:

ISF main.knb // input from the main KNB file

SEL Data Units

The basic data units of SEL are input code lines (given in the Code Line Operand portion of a SEL instruction), output code lines (included in the input line or formed in the Internal String tables in the IE, character strings, integral decimal values, and logical values. The operations of the IE are performed on these basic units.

The input code line units are made a part of the SEL instruction itself. The External and Internal units are either read in from the Application database file, communicated to the IE using the Code Line Operand part of a SEL instruction, or computed or composed internally through operations performed in the IE processing unit. The composed output code lines are written to the current output file.

SEL Command Format

The following shows the format of the Command portion of a SEL instruction:

| Mnemonic | Comp Code | External Operand | Internal Operand |

The format or a complete SEL instruction is similar to a three operand Assembler instruction with an External operand, an Internal operand, an a Code Line operand. The action that takes place can involve any one or all three operands. For example, the Comparison code can evaluate the External operand against the Internal operand and to determine if the mnemonic-specified operation should be performed. The Mnemonic code can specify that information in an External operand or the Code Line operand is to be stored in an Internal Operand, etc.

Mnemonic Field

The Mnemonic field contains the instruction code that is conditionally performed by the processing unit. The types of operations that can be performed are divided up into categories: input/output instructions, control instructions, arithmetic instructions (counting, incrementing, decrementing, etc.), logical instructions (forming logical propositions), and string and code line management instructions.

The principal string management instruction that is provided is a Copy instruction that is used to propagate code lines conditionally to the output file. This instruction contains a powerful formatting capability (similar to the sprintf function in the C language) which can insert characters, character strings, digits, numbers, or logical values (TRUE, FALSE) from either the External or Internal tables into an output code line.

Condition Code

The Condition Code field is used to specify an inference operation (if desired) that should be performed before the instruction specified in the Mnemonic field is operated. The result of the conditional evaluation controls whether the instruction is performed or not. Conditions can be specified which can compare any two members of the External, Internal or Code Line operand fields. If only one operand is specified (i.e., an External table member or an Internal table member), then the specified table member's value can be compared individually against a zero value (i.e., an empty string, a zero value, or a FALSE value).

Operand Field Format

The following shows the general format used for the External operand field and the Internal operand field:

| Address Mode | Field Type | Table Offset |

The format shown above is used for both types of operands and is identical with the exception that the External table offset is 4 digits in length (capable of addressing 10,000 different table members) and the Internal table offset is 3 digits (capable of addressing up to 1000 different table members).

Address Mode

The Address Mode field permits the addressing mechanism to employ two modes of table access, direct and relative. The direct method is self explanatory, and causes the member at the given table offset to be accessed. The relative addressing access method is used with instructions in repeat loops. It accesses table members at addresses relative to base addresses which are automatically computed and maintained within the IE.

Field Type

The Field Type specification selects one of the three types of data tables maintained by the IE. If no specification is given then the operation specified does not involve a table member. The three possible values for this entry are:

S means Strings Table member
I means Integers Table member
L means Logics Table member

Table Offset

The Table Offset entry is a numeric entry specifying the direct offset from the beginning of the table or the relative offset from an IE maintained base register. The External Operand field provides for a 4-digit value, while the Internal Operand field provides for a 3-digit value.

Rules for each SEL Instruction

In this section we will examine the categories of SEL instructions to define the actions corresponding to each instruction. As each instruction is presented the manner in which it utilizes the internal registers, the External and Internal tables, and the code lines will be examined.

Input/Output Instructions

The Input/Output instructions control the sources of inputs and the destinations of outputs. In general, instructions are provided to (1) include or switch to other Knowledgebase files, (2) coordinate inputs and outputs with previously generated output files, (3) create and concatenate output to various files, (4) close the processing of files, and (5) perform some file management functions, such as deleting and renaming files. All Input/Output instructions (except the Output Indexed File instruction) can be made dependent on values stored in the External or Internal tables; see the Condition Code and Operand Field format information discussed above.

Include Sequential File—ISF

ISF filename [/parameters]

The identity of the primary or main Knowledgebase file must be included on the command line when the IE program is first operated. Once the sequence of instructions from this file is started, the subsequent use of the ISF instruction causes the source of input instructions and codes to be switched from the current Knowledgebase file to the file specified in the filename entry in Code Line operand field.

At that time the records stored in the new file will be read and processed until the end of the included file is reached, or until an EFI (End of File Input) instruction is encountered in the included file, or unless another ISF or an IIF (Include Indexed File) instruction is encountered in the included file. The ability to include or switch to new files gives the IE the ability to process many useful kinds of program code files, such as header files, copyright message files, etc., as well as the ability to coordinate among a host of special Knowledgebase files. The IE permits the nesting of include files to ten levels; i.e., up to 10 different Knowledgebase files can be opened simultaneously for input. After the information in each file is completed, input control shifts back to the previously accessed file.

Each ISF instruction must name an include file in its Code Line operand field. The Code Line operand field also can also specify an optional parameters entry which is used to specify the security mode: /C means a plain text file (default), /E means an encrypted file.

Include Indexed File—IIF

IIF filename,unit [/parameters]

The use of indexed Knowledgebase files provide a capability to store (within one physical file) a number of logical file units that can be accessed individually as though they were discrete files. The IIF instruction permits you to specify that a code unit is to be retrieved from an indexed Knowledgebase file whose name is specified in the filename entry. The specified logical unit is an addressable subset of the indexed Knowledgebase file, and it can contain one or more SEL instruction lines.

Storing SEL instruction blocks in logical file units provides a way to define and include a pattern once in a Knowledgebase file, and yet provide a way to use it in many situations; for example, in Microsoft Windows, it is useful to store the generalized codes for a dialog box processing function once, and then use the codes for each dialog box needed in a program. Indexed Knowledgebase files may be encrypted or stored in clear text. The security mode for an indexed file is specified in an optional parameter entry included in the Code Line operand field (see the ISF instruction).

Include Coordinated File—ICF

ICF filename

A Coordinated file is a file that was previously generated by the IE and that (possibly) contains additional code lines input by a user. The purpose of the ICF instruction is to name the file that is to be coordinated with the current file being generated. You should place the ICF instruction in the Knowledgebase file just after an OSF (Output Sequential File) instruction and before the first code line of the output file to be generated. The file name extension of the coordinated file must match the extension of the file that is currently being generated.

The action of the IE coordinator is to generate an internal copy of the code line that was produced the last time the output file was generated. It compares this code line with the next line it reads from the coordinated file. If the two code lines are not the same the coordinated file input line is copied directly to the output file (i.e., the line must have been added by the user). If the coordinated line that was read and the internal line that was generated are the same, the files have been coordinated and a new code line can be generated. The new code line may be the same as the previously generated code line, or it may be different because of new requirements. Either way the new generation process and the previous generation process are coordinated on a line-for-line basis.

The coordination of previous versions of files with their current generation depends on the IE generated lines being exactly the same. As a consequence, the IE generated lines should not be modified, or the modifications will be generated into the output file along with the new IE generated code lines. It will then be necessary to edit the results to make them correct for the desired purposes.

Also, if the IE generated lines are deleted, the coordinator will read and copy all of the previous program to the new output file. This is caused by the coordinator attempting to match to a code line which it knows it generated in the last version, but can't find in the current copy. For things to work properly, the programmer should not change or delete code lines generated by the IE. If a fundamental change is desired in how code lines are generated and coordinated, the identical change should be made to the appropriate Knowledgebase file and the generated output file.

Output Sequential File—OSF

OSF filename [/parameters]

Only one output file can be opened at any one time. The OSF instruction opens a sequential output file of the name specified in the filename entry. The output code lines will be directed to this file until the current input Knowledgebase instruction stream is completed or until an EFO (End of File Output) instruction is encountered in the current input stream.

Control of the output is switched from output file to output file by closing the current output file with an EFO (End of File Output) instruction and opening another output file using an OSF instruction.

The currently selected output file is the file that receives the information output by the OUT instruction. The OUT instruction is similar to a write instruction, and is the only SEL instruction that directly produces output to a disk file. All other SEL instructions either control input from Knowledgebase files, control coordination with previously generated files, or manipulate information within the IE for subsequent output to the current output file.

Output Indexed File—OIF

OIF filename [/parameters]

The OIF instruction is provided as a utility to index properly prepared input files. After encountering the OIF instruction, the IE simply reads the master Knowledgebase file, indexes its code units, and writes it to the named output file. None of the other facilities of the IE are used.

Append to Sequential File—APP

APP filename [/parameters]

The APP instruction operates in a similar fashion to the OSF (Output Sequential File) instruction, except that all output is appended to the named output file rather than creating the output file and starting at its beginning. See the OSF instruction for more information on generating output files.

End of File Input—EFI

EFI

The presence of the EFI instruction in an input stream is to cause the current input file to be closed and revert input from the last input file that was being used when the file was accessed. If the EFI is in the input stream of the master Knowledgebase file, input is halted as though the end of file was detected on the input file.

End of File Output—EFO

EFO

The presence of the EFO instruction in an input stream is to cause the current output file to be closed. No output is then possible until a new output file has been specified using an OSF (Output Sequential File) instruction.

Delete File—DEL filename

DEL

The DEL instruction is provided to erase or delete the specified file from the disk directory. This command works very similarly to the DOS or OS/2 Erase or Delete command. The same care should be exercised in its use. This command does not provide a prompt asking you if you are sure you want to delete the file. This instruction is most commonly used with the next instruction, the REN (Rename File) instruction.

A common practice in generating output files using the IE is to give the output files temporary names that are used during the generation/coordination process. Once the new output file (the temporary file) has been completely generated, the coordinated file can be deleted and the temporary file can be renamed using the desired output file name.

Rename File—REN

REN oldname,newname

The REN instruction is used to change the disk directory name of the file name specified as oldname to the file name specified by newname. This instruction is most commonly used with the DEL (Delete File) instruction discussed above.

Output Code Line—OUT

OUT

The OUT instruction is the workhorse of the SEL instruction set. It is the one instruction that is most often used. It can be used to output string values stored in the External and Internal String table members or to output the string value given in the Code Line operand field.

Before the Code Line operand string is output it is first processed using the IE's input code line formatter. The Knowledgebase coder has the option of using special SEL format codes within every Code Line operand. The IE evaluates these format specifications and substitutes External and Internal table member values into the output code line. Consider the following example:

Suppose that an 8-character file name value is stored in the External String table member, number 120. Suppose also that its corresponding 3-character extension value is stored in the next External String table member number 121. Now, suppose it is desired to make a proper DOS or OS/2 filename entry from these two string values and make it a part of a C language file open statement. The following illustrates how this could be performed using the SEL instruction set. Note the use of the Internal String table member, number 10, as a temporary holding area for the string value being constructed and used in the OUT instruction.

| | |
|---|---|
| CPY | &S010 " |
| CAT | &S0120,&S010 |
| CAT | &S010 . |
| CAT | &S0121,&S010 |
| OUT | retrn = fopen(&S10, oflag, pmode); |

Arithmetic Instructions

The SEL Arithmetic instructions are used to compute Internal Integer Table variables. Values contained in the Internal Integer Table members can be used for any purpose the Knowledgebase coder desires. Table members may be used as counters, accumulators, storage areas, or for any purpose where an integer operand is desired.

One or two operands are always used in an arithmetic operation, with one of the operands always being the Internal Integer Table operand. Either of the other two operand fields (i.e., the External Integer Table or an integer operand specified in the Code Line Operand field) can also be involved in certain arithmetic operations. The receiver of the arithmetic action is always the Internal Integer Table operand; that is, the result of the arithmetic operation is always stored at the specified Internal Integer Table address.

Add to Internal Register—ADD

ADD

The ADD instruction adds to the Internal Integer Table member specified, the value specified by the second operand (i.e., the External Integer Table member or the Code Line Operand). The result is stored in the Internal Integer Table member.

Subtract from Internal Register—SUB

SUB

The SUB instruction subtracts from the Internal Integer Table member specified, the value specified by the second operand (i.e., the External Integer Table member or the Code Line Operand). The result is stored in the Internal Integer Table member.

Multiply Internal Register—MUL

MUL

The MUL instruction multiplies the value stored in the Internal Integer Table member specified by the value specified by the second operand (i.e., the External Integer Table member or the Code Line Operand). The result is stored in the Internal Integer Table member.

Divide Internal Register—DIV

DIV

The DIV instruction divides the value stored in the Internal Integer Table member specified by the value specified by the second operand (i.e., the External Integer Table member or the Code Line Operand). The result is truncated to the integer value of the quotient and is stored in the Internal Integer Table member.

Modulo Internal Register—MOD

MOD

The MOD instruction computes the modulus function of the Internal Integer Table member specified to the base value provided by the second operand (i.e., the External Integer Table member or the Code Line Operand). The modulus value (the remainder after dividing the Internal Integer Table member by the base) is stored in the Internal Integer Table member.

Zero Internal Register—ZRO

ZRO

The ZRO instruction zeros the Internal Table member specified. If the table member type is an Integer then its value is set to zero. If the table member type is a Logic then its value is set to FALSE (zero). If the table member is a String then its first position is made NULL (zero), creating a NULL string.

Increment Internal Register—INC

INC

The INC instruction is a one operand instruction, involving only an Internal Integer Table member. The result of the INC instruction is to bump the value stored in the specified Internal Integer Table member by one.

Decrement Internal Register—DEC

DEC

The DEC instruction is a one operand instruction, involving only an Internal Integer Table member. The result of the DEC instruction is to decrement the value stored in the specified Internal Integer Table member by one.

Set Internal Register—SET

SET

The SET instruction sets the value of the specified Internal Table member to the value specified by the second operand. The SET instruction works both with Integer and Logic Table members (i.e., not with Strings). Typically, the SET instruction is used to operate on table members of the same type; however, Integer Table members can be set to Logic values (1's and 0's), and Logic Table members can be set to Integer Table values. In the case of Logic values, the result is always 0 or 1, depending on whether the Integer value is zero or not zero.

Logical Instructions

The SEL Logical instructions are used to perform logical operations on Internal Integer and Logic Table variables. Values contained in the Internal Table members can be used for any purpose the Knowledgebase coder desires. Table members may be used as flags, switches, state values, storage areas for the results of propositional calculus expressions, or for any purpose where a logical (binary) operand is desired.

Two operands are always used in logical operations, with one of the operands always being an Internal Integer or Logic Table operand. Either of the other two operand fields (i.e., the External Logic Table or a logical operand, (TRUE/FALSE or 1/0) specified in the Code Line Operand field) can also be involved in logical operations. The receiver of the logical action is always the Internal Table operand; that is, the result of the logical operation is always stored at the specified Internal Table member address.

AND to Internal Register—AND

AND

The AND instruction forms the logical product of the specified Internal Integer or Logic Table member and the second operand (i.e., the External Logic Table member or the Code Line Operand). The result is stored in the Internal Logic Table member.

Inclusive OR Internal Register—OR

OR

The OR instruction forms the logical sum of the specified Internal Logic Table member and the second operand (i.e., the External Integer or Logic Table member or the Code Line Operand). The result is stored in the Internal Table member.

Exclusive OR Internal Register—EOR

EOR

The EOR instruction forms the logical exclusive OR of the specified Internal Integer or Logic Table member and the second operand (i.e., an External Integer or Logic Table member or the Code Line Operand). The result is stored in the Internal Logic Table member.

Set Internal Register—SET

SET

The SET instruction sets the value of the specified Internal Table member to the value specified by the second operand. The SET instruction works both with Integer and Logic Table members (i.e., not with Strings). Typically, the SET instruction is used to operate on table members of the same type; however, Integer Table members can be set to Logic values (1's and 0's), and Logic Table members can be set to Integer Table values. In the case of Logic values, the result is always 0 or 1, depending on whether the Integer value is zero or not zero.

String Handling Instructions

The SEL String Handling instructions are used to manipulate Internal String Table members. Strings stored in the Internal String Table members can be used for any purpose the Knowledgebase coder desires. Table members may be used to store variable names, file names, labels, storage areas for the results of string operations, or for any purpose where a full or partial string operand is desired.

Two operands are always used in string operations, with one of the operands always being an Internal String Table operand. Either of the other two operand fields (i.e., the External String Table or a string operand specified in the Code Line Operand field) can also be involved in string operations. The receiver of a string operation is always the Internal String Table operand; that is, the result of a string operation is always stored at the specified Internal String Table address.

Copy to Internal String—CPY

CPY

The CPY instruction is used to copy the string specified by the second operand (i.e., an External String Table member or a string included on the Code Line) to the Internal String Table member specified. Any value previously stored at the Internal String Table member address is lost.

CONCLUSION

It will now be appreciated that what has been provided is a method and system for automatic generation of program code. The system uses expert knowledge programmed into a knowledgebase. The expert knowledge includes not only program script adapted to a generic problem to be solved, but also instructions for "composing" the script units into output script. An application database operates in conjunction with the knowledgebase. The function of the application database is to specify particular requirements for the process to be programmed within the generic set stored in the knowledgebase. A program processor responds to the application database and the knowledge database to produce output files coordinated to the particular task specified.

What is claimed is:

1. A process for producing program code files for specific applications within a generic application set, the process comprising the steps of:
   defining a generic set of standard software units with sufficient generality to accommodate a plurality of permutations within the generic application set,
   defining in conjunction with the set of standard software units a set of rules and procedures for assembling the standard software units into specific composed units, the structure of any particular composed unit being dependent on values of a predetermined set of variables,
   constructing an application database specifying a particular set of variables which define a specific application within the generic application set, and
   composing the standard software units in accordance with the rules and procedures as adapted by the variables in the application database to produce a customized program code file adapted to the specific application defined by the set of variables.

2. The process as set forth in claim 1 wherein the process further comprises the step of linking the set of rules and procedures to variables within the application database by means of a data dictionary.

3. The process as set forth in claim 2 wherein the rules and procedures require alteration of some of the standard software units, and the data dictionary includes means for linking a variable in the application database specifying a particular alteration to the standard software unit to be altered.

4. The process as set forth in claim 1 wherein the customized program code file being produced is related, in part, to a previously produced program code file in which software modifications have been made, the process further comprising the step of transferring coordinated files from the previously produced program code file to the program code file then being produced so that said program code file then being produced has the modifications from the previous program code file automatically transferred thereto.

5. A process for producing program code files for specific applications within a generic application set, the process comprising the steps of:
   (a) defining a reusable knowledgebase including: standard software units comprising standard sequences of scripts, alternative scripts, and standard scripts with replaceable components, an SEL language including instructions defining rules and procedures for assembling the standard software units,
   (b) defining an application specific requirements database specifying parameters defining requirements related to a selected specific application within the generic application set,
   (c) processing the knowledgebase in accordance with the parameters specified in the application specific requirements database to produce a program code file suited to said selected specific application, and
   (d) repeating steps (b) and (c) with new sets of specified parameters to produce multiple variations of program code for a plurality of specific applications within the generic application set.

6. The process as set forth in claim 5 wherein the step of processing further comprises assembling standard software units by copying directly at least some of the standard sequences of scripts, and altering other sequences of scripts based on information in the requirements database.

7. The process as set forth in claim 6 wherein the process further includes the step of linking, by means of a data dictionary, parameters stored in the requirements database which specify a script alteration with an SEL instruction which accomplishes said alteration.

8. The process as set forth in claim 6 wherein the process further includes the step of maintaining a state of at least a given variable as processing of the knowledgebase proceeds, and responding to at least one of the SEL instructions to alter a standard script sequence in accordance with the then-current state of said given variable.

9. The process as set forth in claim 6 wherein at least some of the standard sequences of scripts include alterable components, and the SEL language includes means for altering said components based upon a specific parameter taken from the requirement database.

10. The process as set forth in claim 9 wherein the process further includes the step of utilizing the data dictionary to link said SEL instruction and said specific parameter.

11. The process as set forth in claim 5 wherein the program code file being produced is related, in part, to a previously produced program code file in which script modifications have been made, the process further comprising the step of transferring coordinated files from the previously produced program code file to the program code file then being produced, so that said program code file then being produced has the script modifications from the previous program code file automatically transferred thereto.

12. The process as set forth in claim 5 wherein the step of defining a requirements database comprises providing a prototyper program for generating a set of queries requesting user input information intended to define the requirements for the specific application, and responding to the queries to create the requirements database.

13. The process as set forth in claim 12 wherein a dictionary portion of the requirements database is used to link elements of data in a data portion of the requirements database to the knowledgebase under the control of the SEL instructions.

14. A process for producing program code files for specific applications within a generic application set, the process comprising the steps of:
(a) defining a reusable multi-purpose database including (i) standard software units, and (ii) rules and procedures for linking said standard software units to accomplish particular purposes as defined by a set of internally stored variables,
(b) creating a specialized application database defining a particular set of variables adapted to a specific application within the generic application set,
(c) processing the reusable database in conjunction with the variables specified in the specialized application database to produce a program code file suited to the specific application defined by the variables in the specialized application database, and
(d) repeating steps (b) and (c) for new sets of variables each time it is desired to produce a new specific application within the generic application set, thereby to standardize program code in the produced program code files in accordance with that stored in the reusable multi-purpose database.

15. The process as set forth in claim 14 further comprising the step of providing a data dictionary to link variables within the specialized application database with the rules and procedures in the reusable multi-purpose database.

16. A system for producing program code files for a generic application, the system being adapted to produce program code files comprising configurations of standard software units assembled to specified sets of requirements to suit specific applications within the genus, the system comprising, in combination:
a knowledgebase containing SEL instructions defining a generic set of rules and procedures for assembling the standard software units,
a fixed database containing the standard software units, the standard software units comprising at least standard sequences of scripts, alternative scripts, and standard scripts with replaceable components,
a requirements database having a dictionary portion and a data portion,
means for storing data in the requirements database, said stored data specifying parameters defining requirements related to a selected specific application, and means identifying the stored data in the dictionary, and
program processor means for processing the SEL instructions in accordance with the generic set of rules thereof to assemble standard software units selected from the fixed database according to the parameters specified in the requirements database to produce a program code file suited to said specific application.

17. The system as set forth in claim 16 wherein the program processor includes means for copying directly at least some of the standard sequences of scripts, and means for altering before copying other sequences of scripts based on information in the requirements database.

18. The system as set forth in claim 17 wherein the dictionary portion within the requirements database links data within the requirements database which specifies script alternations with an SEL instruction which accomplishes said script alteration.

19. The system as set forth in claim 17 wherein the program processor comprises a state machine which maintains a running status of a given conditions, and the program processor includes means for responding to at least one of the SEL instructions to alter a standard script sequence in accordance with the then-current status of the state machine.

20. The system as set forth in claim 17 wherein at least some of the standard sequences of scripts include alterable components, and the SEL instructions include means for altering said alterable components based upon a variable stored in the data portion of the requirements database.

21. The system as set forth in claim 20 wherein the dictionary links said SEL instruction and said specific variable.

22. The system as set forth in claim 16 further including file coordination means comprising means for coordinating a previously produced program code file in which script modifications have been made with the program code file then being produced, thereby to transfer the script modifications into the newly produced version of the program code file.

23. The system as set forth in claim 16 further including a prototyper for generating a set of queries requesting user input information intended to define the requirements for the selected specific application, and means for transferring responses to the queries to the data portion of the requirements database.

24. The system as set forth in claim 23 wherein the dictionary portion of the requirements database serves to link elements of data in the data portion of the requirements database with SEL instructions which require said data.

25. A system for producing program code files for specific applications within a generic application set, the system comprising, in combination:
a reusable knowledgebase including standard software units comprising standard sequences of scripts, alternative scripts and standard scripts with replaceable components,
an SEL language including instructions defining rules and procedures for assembling the standard software units,
an application specific requirements database for specifying parameters defining requirements related to a selected specific application,
a program processor for processing the knowledgebase in accordance with the parameters specified in the application specific requirements database to produce a program code file suited to said selected specific application, and
means for altering the parameters in the application specific requirements database to specify newly defined parameters thereby to allow re-processing of the knowledgebase in accordance with the newly defined parameters specified in the application specific requirements database to produce further program code files suited to further specific applications.

26. The system as set forth in claim 25 wherein program process further includes means for copying directly at least some of the standard sequences of scripts, and means for altering before copying other sequences of scripts based on information in the requirements database.

27. The system as set forth in claim 26 further including data dictionary means for linking parameters stored in the requirements database which specify script alterations with an SEL instruction which accomplishes said script alteration.

28. The system as set forth in claim 26 wherein the program processor further comprises a state machine for maintaining the state of at least one given variable as the knowledgebase is processed, and means for responding to at least one of the SEL instructions to alter a standard script sequence in accordance with the then-current state of said variable.

29. The system as set forth in claim 26 wherein the standard software units include alterable components, and the SEL language includes means for altering said components based upon a parameter stored in the requirements database.

30. The system as set forth in claim 29 further comprising a data dictionary for linking said SEL instruction and said parameter.

31. The system as set forth in claim 20 wherein the program code file being produced is related, in part, to a previously produced program code file in which script modifications have been made, the system further comprising means for coordinating the program code file then being produced with the previously produced program code file with script modifications so that said program code file then being produced has the script modifications from the previous program code file automatically transferred thereto.

32. The system as set forth in claim 25 further including prototyper means for generating a set of queries requesting user input information intended to define the requirements for the specific application, and means for transferring response to the queries to the requirements database.

33. The system as set forth in claim 32 further including a dictionary means in the requirements database for linking elements of data in a data portion of the requirements database to knowledgebase under the control of SEL instructions.

34. A system for producing program code files for specific applications within a generic application set, the system comprising, in combination:
a fixed database comprising a generic set of standard software units with sufficient generality to accommodate a plurality of permutations within the generic application set,
a rules and procedures database storing a set of rules and procedures for assembling the standard set of software units into specific composed units, the structure of any particular composed unit being dependent on values of a predetermined set of variables,
an application database for storing a particular set of variables which define a specific application within the generic set,
means for storing a particular set of variables within the application database, and
processing means for composing the standard software units in accordance with the rules and procedures as adapted by the variables in the application database to produce a customized program code file adapted to the specific application defined by the set of variables.

35. The system as set forth in claim 34 further including dictionary means for linking variables within the application database to the rules and procedures database.

36. The system as set forth in claim 34 further including prototyper means for generating a set of queries requesting user input information intended to define the predetermined set of variables for a specific application, and means for storing data in the application database corresponding to user responses to the queries.

* * * * *